(12) United States Patent
Takahashi et al.

(10) Patent No.: US 9,011,664 B2
(45) Date of Patent: Apr. 21, 2015

(54) ELECTRIC DEMINERALIZER

(75) Inventors: Yohei Takahashi, Kawasaki (JP); Syu Nakanishi, Atami (JP)

(73) Assignee: Swing Corporation, Tokyo (JP)

( * ) Notice: Subject to any disclaimer, the term of this patent is extended or adjusted under 35 U.S.C. 154(b) by 1795 days.

(21) Appl. No.: 10/540,570

(22) PCT Filed: Dec. 26, 2003

(86) PCT No.: PCT/JP03/17033
§ 371 (c)(1),
(2), (4) Date: Jun. 24, 2005

(87) PCT Pub. No.: WO2004/060815
PCT Pub. Date: Jul. 22, 2004

(65) Prior Publication Data
US 2006/0091013 A1    May 4, 2006

(30) Foreign Application Priority Data
Dec. 27, 2002  (JP) .................................. 2002-381262

(51) Int. Cl.
*B01D 61/48*  (2006.01)
*C02F 1/469*  (2006.01)
*B01D 61/50*  (2006.01)

(52) U.S. Cl.
CPC .............. *C02F 1/4695* (2013.01); *B01D 61/48* (2013.01); *B01D 61/50* (2013.01)

(58) Field of Classification Search
USPC ....................................................... 204/632
See application file for complete search history.

(56) References Cited

U.S. PATENT DOCUMENTS

| | | | |
|---|---|---|---|
| 5,308,467 A * | 5/1994 | Sugo et al. ..................... | 204/627 |
| 5,425,866 A | 6/1995 | Sugo et al. | |
| 5,738,775 A | 4/1998 | Nagai et al. | |
| 5,858,191 A | 1/1999 | DiMascio et al. | |
| 5,961,805 A | 10/1999 | Terada et al. | |

(Continued)

FOREIGN PATENT DOCUMENTS

| | | |
|---|---|---|
| EP | 0 621 072 | 10/1994 |
| GB | 2 289 059 | 11/1995 |
| JP | 2000-42374 | 2/2000 |
| JP | 2001-205270 | 7/2001 |
| JP | 2002-205071 | 7/2002 |

(Continued)

OTHER PUBLICATIONS

Joseph D. Gifford: "An Innovative approach to continuous electrodeionization module and system design for power applications", IWC-00-52 Report, 61$^{st}$ Annual International Water Conference, Oct. 2000.

*Primary Examiner* — Arun S Phasge
(74) *Attorney, Agent, or Firm* — Oblon, McClelland, Maier & Neustadt, L.L.P.

(57) ABSTRACT

It is an object of the present invention to provide an electrical deionization apparatus having a novel constitution with excellent deionization efficiency. As means for solving this problem, according to one embodiment of the present invention, there is provided an electrical deionization apparatus having deionization compartments, concentration compartments and electrode compartments partitioned from one another by a plurality of ion exchange membranes between a cathode and an anode, wherein, in the deionization compartments and/or the concentration compartments and/or the electrode compartments, at least one of anion exchange fibrous material layers and cation exchange fibrous material layers are disposed on one another intersecting a water-passing direction.

4 Claims, 18 Drawing Sheets

(56) References Cited

U.S. PATENT DOCUMENTS 6,423,205 B1 * 7/2002 Akahori et al. ............... 205/636
6,482,304 B1 * 11/2002 Emery et al. .................. 204/524
6,649,037 B2 * 11/2003 Arba et al. .................... 204/632

FOREIGN PATENT DOCUMENTS

| JP | 2002-301478 | 10/2002 |
| WO | WO 95/11741 | 5/1995 |
| WO | 99/48820 | 9/1999 |

* cited by examiner

ELECTRIC DEMINERALIZER

TECHNICAL FIELD

The present invention relates to an improvement of a so-called electrical deionization apparatus, and provides an electrical deionization apparatus having a performance greatly exceeding that of a conventional electrical deionization apparatus.

BACKGROUND ART

An electrical deionization apparatus is an apparatus in which concentration compartments and deionization compartments are formed by arranging cation exchange membranes and anion exchange membranes between electrodes, i.e. a cathode and an anode, and taking a potential gradient as a driving force, ions in water to be treated (raw water) in the deionization compartments are made to migrate, and hence be separated out, through the ion-exchange membranes into the concentration compartments, thus removing ionic components.

FIG. 1 shows a conceptual drawing of a typical conventional electrical deionization apparatus. In the electrical deionization apparatus shown in FIG. 1, anion-exchange membranes A and cation-exchange membranes C are arranged alternately between a cathode (−) and an anode (+), thus forming deionization compartments and concentration compartments. By further repeating the alternate arrangement of anion-exchange membranes and cation-exchange membranes, a plurality of deionization compartments and concentration compartments are formed alternately. If necessary, ion exchangers are packed into the deionization compartments and the concentration compartments to promote migration of ions in the compartments. Moreover, the compartments contacting the anode and the cathode at either end are generally called an anode compartment and a cathode compartment, and have a function of giving and receiving electrons of an applied direct current.

In operation of such an electrical deionization apparatus, a voltage is applied between the anode and the cathode, and water is passed into the deionization compartments, the concentration compartments and the electrode compartments. Water to be treated having therein the ions to be subjected to treatment is fed into the deionization compartments, and water having a suitable quality is passed into the concentration compartments and the electrode compartments. In FIG. 1, an example is shown in which RO treated water is fed into all of the deionization compartments, the concentration compartments and the electrode compartments. When the water is passed into the deionization compartments and the concentration compartments in this way, in each of the deionization compartments the cations and anions in the water to be treated are attracted to the cathode and the anode respectively; because only anions selectively permeate through the anion-exchange membranes and only cations selectively permeate through the cation-exchange membranes, cations ($Ca^{2+}$, $Na^+$, $Me^{2+}$, $H^+$ etc.) in the water to be treated pass through a cation-exchange membrane C and migrate into a concentration compartment on the cathode side, and anions ($Cl^-$, $SO_4^{2-}$, $HSiO_3^{2-}$, $HCO_3^-$, $OH^-$ etc.) pass through an anion-exchange membrane A and migrate into a concentration compartment on the anode side. On the other hand, migration of anions from the concentration compartment on the cathode side into the deionization compartment and migration of cations from the concentration compartment on the anode side into the deionization compartment are blocked due to each of the ion-exchange membranes having a property of blocking ions of the opposite sign. As a result, deionized water having a reduced ion concentration is obtained from the deionization compartments, and concentrated water having an increased ion concentration is obtained from the concentration compartment.

According to such an electrical deionization apparatus, by using water containing few impurities, for example, RO (reverse osmosis membrane) treated water as the water to be treated, pure water of yet higher purity is obtained as the deionized water. Recently, there has come to be a demand for ultrapure water of yet higher purity, for example, ultrapure water for semiconductor manufacture. In recent electrical deionization apparatuses, a method is thus known in which cation-exchange resin beads and anion-exchange resin beads are mixed together and packed as an ion exchanger into the deionization compartments and/or the concentration compartments and/or the electrode compartments so as to promote migration of ions in these compartments. Furthermore, there has also been proposed a method in which as an ion exchanger, a cation-exchange fibrous material (nonwoven fabric etc.) on the cation-exchange membrane side and an anion-exchange fibrous material on the anion-exchange membrane side are disposed face-to-face in a deionization compartment, and a spacer or an ion-conducting spacer having ion-conductivity is packed between these ion-exchange fibrous materials (see, for example, JP-A-H5-64726, and WO 99/48820).

When water to be treated is passed into a deionization compartment having an ion exchanger packed therein as described above, ion-exchange groups in the ion exchanger and the salt to be removed in the water to be treated undergo an ion-exchange reaction, whereby the salt is removed. For example, in the case of using NaCl as the salt to be removed, sulfonic acid groups as cation exchange groups and a quaternary ammonium salt as anion exchange groups, removal of NaCl can be explained as follows:

When the water to be treated having the salt to be removed (NaCl) dissolved therein contacts the cation exchanger, the cations ($Na^+$) in the water to be treated are subjected to ion exchange by the cation-exchange groups, and are adsorbed onto the solid phase (cation exchanger) and thus removed (equation 1).

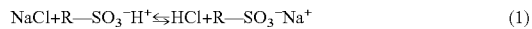
$$NaCl+R—SO_3^-H^+ \leftrightarrows HCl+R—SO_3^-Na^+ \qquad (1)$$

After the cations have been removed to some extent by contacting with the cation exchanger, the water to be treated next contacts the anion exchanger. At this time, the acid (HCl) that has been produced by the ion-exchange reaction (equation 1) due to the cation-exchange groups is completely neutralized as shown in equation 2.

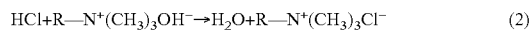
$$HCl+R—N^+(CH_3)_3OH^- \to H_2O+R—N^+(CH_3)_3Cl^- \qquad (2)$$

On the other hand, salt to be removed in the water to be treated that has not reacted with the cation exchanger contacts the anion exchanger, and the anions ($Cl^-$) are subjected to ion exchange by the anion-exchange groups as shown in equation 3, and are adsorbed onto the solid phase (anion exchanger) and thus removed.

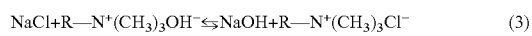
$$NaCl+R—N^+(CH_3)_3OH^- \leftrightarrows NaOH+R—N^+(CH_3)_3Cl^- \qquad (3)$$

Next, the water to be treated contacts the cation exchanger, and the alkali (NaOH) that has been produced by the ion-exchange reaction due to the anion-exchange groups (equation 3) is neutralized as shown in equation 4.

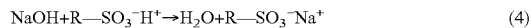
$$NaOH+R—SO_3^-H^+ \to H_2O+R—SO_3^-Na^+ \qquad (4)$$

Equations 1 and 3 above are equilibrium reactions, and hence the salt to be removed contained in the water to be treated is not completely removed by ion exchange upon contacting the anion exchanger once and the cation exchanger once, but rather remains in the water to be treated to some extent. To remove the ions efficiently, it is necessary to carry out the reactions of equations 1 to 4 repeatedly, and hence it is important to make the water to be treated contact the cation exchanger and the anion exchanger alternately as many times as possible so as to make the salt to be removed migrate into the solid phase through the reactions of equations 1 to 4.

For the ions to be removed in the water to be treated to undergo ion-exchange and neutralization reactions as described above, a two-stage process of the ions to be removed migrating into the vicinity of functional groups and then being subjected to the ion-exchange reaction is necessary. In an electrical deionization apparatus, the water to be treated is fed continuously into each deionization compartment, and must undergo the ion-exchange and neutralization reactions during the short time of passing through the deionization compartment; it is thus desirable for the ions to be removed in the water to be treated to diffuse into the vicinity of functional groups of an ion exchanger in a short time, and for the frequency of contact between the functional groups and ions to be kept high.

Moreover, in an electrical deionization apparatus, it is necessary for the ions to be removed that have been adsorbed onto the solid phase (ion exchangers) by the ion-exchange and neutralization reactions of equations 1 to 4 above to migrate from a deionization compartment into a concentration compartment or electrode compartment when applying current. Moreover, at this time, it is desirable for the ions to be removed that have been adsorbed into the ion exchangers to continuously migrate to an ion-exchange membrane between the deionization compartment and the concentration compartment on the solid phase (ion exchanger) without desorbing into the liquid phase. That is, in the deionization compartment, it is desirable for the cation exchanger contacting the cation-exchange membrane and the anion exchanger contacting the anion-exchange membrane to each be packed in as though they form a continuous phase.

Furthermore, in an electrical deionization apparatus in which ion exchangers are packed into compartments as described above, in each of the deionization compartments and/or concentration compartments having the ion exchangers packed therein, there exist places where the cation-exchange groups and anion-exchange groups contact with each other. At a place where a cation-exchange group and an anion-exchange group contact with each other in a deionization compartment in particular, water dissociation (equation 5) will occur under the steep potential gradient

$$H_2O \rightarrow H^+ + OH^- \qquad (5)$$

and the ion exchangers in the deionization compartment will be regenerated by $H^+$ ions and $OH^-$ ions produced by this water dissociation (water dissociation), whereby pure water of high purity can be obtained. For efficient deionization, it is thus desirable to make it such that there are many places where the anion exchanger and the cation exchanger contact with each other and water dissociation occurs. Furthermore, $H^+$ ions and $OH^-$ ions produced by water dissociation regenerate ion exchange groups of adjacent cation and anion exchangers one after another. When continuing to apply current, there will come to be a local lack of counter-ions to the functional groups at the contacting places between the cation exchanger and the anion exchanger. The water in the vicinity of the functional groups will be dissociated, and $H^+$ ions and $OH^-$ ions can be continuously supplied to the cation-exchange groups and the anion-exchange groups. Moreover, not only with water but also with nonelectrolyte such as alcohol, polarization and dissociation will occur under a strong electric field to form anions and cations which will be adsorbed into the functional groups, enabling removal from the water. It is thus desirable for the contact places between the anion exchanger and the cation exchanger (the places where water dissociation occurs) to be numerous and to exist throughout the whole of each deionization compartment in particular, and furthermore it is desirable for the anion exchanger and the cation exchanger to each be disposed as though they form a continuous phase from the contact places.

Furthermore, in recent years there has been a demand for pure water of yet higher purity, it being desired for the concentration of TOC (total organic carbon) components contained in treated water to be low. As to TOC components contained in treated water obtained from electrical deionization treatment, there are endogenous one, i.e. those originating from components eluted out from the ion exchangers packed into the electrical deionization apparatus, and exogenous one, i.e. those originating from TOC contained in the water to be treated. Many of the TOC components eluted out from the ion exchangers are unreacted monomers or uncross-linked polymer electrolytes that became attached to an ion exchanger during synthesis of the ion exchanger. These are gradually eluted out into the liquid phase upon washing by passing water, and it is desirable to make the ion exchangers have a structure such that this washing can be carried out in as short a time as possible. Moreover, it is desirable to eliminate a cross-linking reaction from the ion-exchanger synthesis process so that contamination of the ion exchangers with uncross-linked polymer electrolytes can be prevented. Regarding TOC components contained in the water to be treated, on the other hand, they can be removed by being ionized under the strong potential gradient between cation and anion exchange groups same as with the water dissociation reaction. It is thus desirable for it to be possible to supply water to be treated containing TOC components uniformly to the contact places between the cation exchanger and the anion exchanger.

Moreover, it is further desirable for the treated water (pure water) obtained to have a low concentration of weak electrolytes such as silica and carbonate. Again, ionization of such weak electrolytes under the strong potential gradient is effective same as with the water dissociation reaction between cation and anion exchange groups. Accordingly, it is also desirable for it to supply the contact places between the cation exchanger and the anion exchanger with water to be treated containing weak electrolytes uniformly.

The functions demanded for an electrical deionization apparatus have been described above; however, with a conventional electrical deionization apparatuses, it has not been possible to obtain an apparatus that satisfies all of these demands.

For example, with many conventional electrical deionization apparatuses, mixed anion-exchange resin beads and cation-exchange resin beads have been packed together in a deionization compartment. In this case, the state of packing of the resins is random, and moreover the flow direction of water in the compartment is also random, and from microscopic viewpoint, regarding the contact between the water to be treated and the ion exchangers, it is not necessarily the case that the water to be treated contacts the anion exchanger and the cation exchanger alternately. Moreover, regarding the particle diameter of the ion-exchange resin beads packed in, in general beads having a particle diameter of approximately 500 μm are used so as to decrease pressure loss, but most of the functional groups of such ion-exchange resin beads are present in macropores and micropores inside the resin beads, and hence it is difficult for ions to be removed to diffuse to the vicinity of functional groups, and hence the frequency of contact between the ions to be removed and the functional groups is not very high. Moreover, because the cation exchanger and the anion exchanger are packed in randomly, it is difficult for the cation exchanger and the anion exchanger to form a continuous phase, and hence it is difficult for the ions to be removed to migrate continuously through the solid phase from the deionization compartment into a concentration compartment, and moreover the TOC component removal performance and the weak electrolyte removal performance are poor. Furthermore, there has been a problem that there is much TOC components eluted from the ion-exchange resin beads, and in particular it is difficult to completely remove TOC components eluted from the inside of macropores and micropores even if the resin beads are washed with water for a long time.

Moreover, as to conventional electrical deionization apparatuses, method in which ion-exchange resin beads are packed in layers have also been proposed. As to electrical deionization apparatuses using this method, there are ones in which anion-exchange resin beads and cation-exchange resin beads are packed in layers alternately in a deionization compartment with a plastic mesh screen or the like interposed therebetween as necessary, ones in which a deionization compartment is divided with division plates and anion-exchange resin bead beds and cation-exchange resin bead beds are formed in each partition in the compartments, ones in which blocks are formed by binding ion-exchange resin beads with a binder and anion-exchange resin bead blocks and cation-exchange resin bead blocks are packed in alternately, and so on. However, packing anion-exchange resin beads and cation-exchange resin beads into a deionization compartment alternately in an orderly fashion while forming laminate structure is very difficult. Moreover, in the case that a mesh screen or the like is interposed between layers, or the deionization compartment is divided with division plates alternately, the contact plates between the anion and cation exchange groups (the places where water dissociation occurs) are limited to the planes contacting the ion-exchange membranes and the ion exchangers packed into the compartment, and hence it is not possible to form a large number of places where water dissociation occurs in the deionization compartment. Moreover, in the case that the deionization compartment is divided with division plates, the number of resin layers that can be formed is limited to from a few to a few dozens from the workability of assembling the compartment and the overall size of the apparatus. Moreover, in the case that ion-exchange resin beads are used, as described above, the frequency of contact between the ions to be removed and the ion exchange groups is not very high. Furthermore, in the case of binding ion-exchange resin beads with a binder, the flow of the water is restricted by the binder, and hence the frequency of contact between the ions to be removed and the ion exchange groups is lowered remarkably. Moreover, because ion-exchange resin beads are used, as described above, the much amount of TOC elutes, and in particular in the case of using a binder, the binder itself becomes a component that elutes, and hence the TOC concentration in the treated water becomes yet higher. Furthermore, as described above, the contact places between the anion and cation exchange groups are limited to the planes of contact between the ion-exchange membranes and the ion exchangers packed into the compartment, and most of the water to be treated does not flow through here, and hence ionization of TOC components and weak electrolytes is difficult, and thus the removal performance thereof is poor.

To resolve the various problems for causing use of ion-exchange resin beads described above, using an ion-exchange fibrous material obtained by introducing ion-exchange groups to a fibrous material such as a woven fabric or a nonwoven fabric by radiation-induced graft polymerization or the like as a material packed into a deionization compartment has been proposed (e.g. previously mentioned JP-A-H5-64726). Such an ion-exchange fibrous material has a greater specific surface area than ion-exchange resin beads, and it is not the case that the ion-exchange groups are present in micropores or macropores inside of ion exchange resin beads, but most of ion-exchange groups are disposed on the fiber surfaces. Therefore, the ions to be removed in the water to be treated are readily transported by the water flow (effect by convection) to the vicinity of the ion-exchange groups. When an ion-exchange fibrous material is used, comparing with the case of ion-exchange resin beads, the frequency of contact between the ions to be removed and the ion-exchange groups can thus be increased markedly.

However, a fibrous material such as woven fabric or a nonwoven fabric does not generally have high water permeability, and hence it has been thought that if a fibrous material is packed into a conventional narrow deionization cell, then the pressure loss will be too high to obtain a sufficient water flowrate.

An electrical deionization apparatus has thus been proposed in which a cation-exchange fibrous material such as a nonwoven fabric at the cation-exchange membrane side and an anion-exchange fibrous material at the anion-exchange membrane side are disposed face-to-face in a deionization compartment, and for an example an oblique-net spacer, or an ion-conducting spacer obtained ion-conductivity, is packed between these ion-exchange fibrous materials (e.g. the previously mentioned WO99/48820). In the case of an apparatus having such a constitution, the water to be treated flows with turbulent state inside the oblique-net spacer or ion-conducting spacer, and contacts the cation-exchange fibrous material and anion-exchange fibrous material. Although the water to be treated thus contacts the cation-exchange fibrous material and the anion-exchange fibrous material alternately, alternate contact is not carried out sufficiently efficiently with this constitution. Moreover, although fibrous materials having a large surface area and a lot of available ion-exchange groups are used, due to the difference in the water permeability between the fibrous materials and the spacer, most of the water to be treated flows through the spacer, and significantly little water flows through the nonwoven fabrics. The frequency of contact between the ions to be removed and the ion-exchange groups is thus low.

DISCLOSURE OF THE INVENTION

The present inventors systematically studied the functions demanded for an electrical deionization apparatus as described above, and as a result realized that to increase the deionization performance and the TOC removal performance, the followings are important: making the water to be treated contact a cation-exchanger and an anion-exchanger alternately as many times as possible; increasing the frequency of contact between the ions to be removed in the water to be treated and the ion exchange groups; continuous phases of each of the anion exchanger and the cation exchanger being formed between the anion-exchange membrane and the cation-exchange membrane in each deionization compartment;

and forming a large number of contact places between the cation and anion exchange groups throughout the whole of the deionization compartment, and sufficiently supplying these contact places with the water to be treated. The present inventors then carried out studies aimed at providing an electrical deionization apparatus satisfying all of the functions, and as a result, by selecting suitable materials and improving the packing method, succeeded in greatly improving the deionization performance and the TOC removal performance of an electrical deionization apparatus.

Following is a description of various specific embodiments of the present invention, with reference to the drawings.

DRAWING_DESCRIPTION

DETAILED DESCRIPTION OF THE INVENTION

Figure 1:
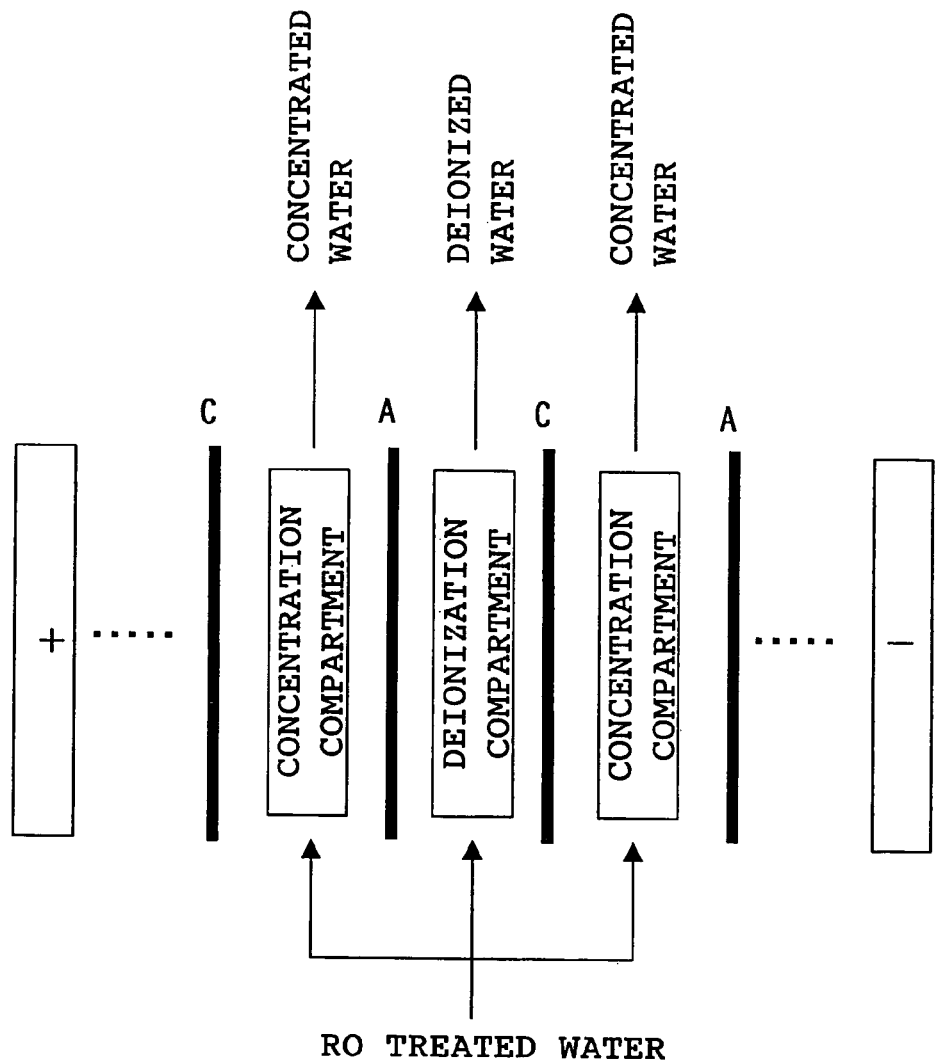
FIG. 1 is a conceptual drawing showing the principle of an electrical deionization apparatus.
Figure 2:
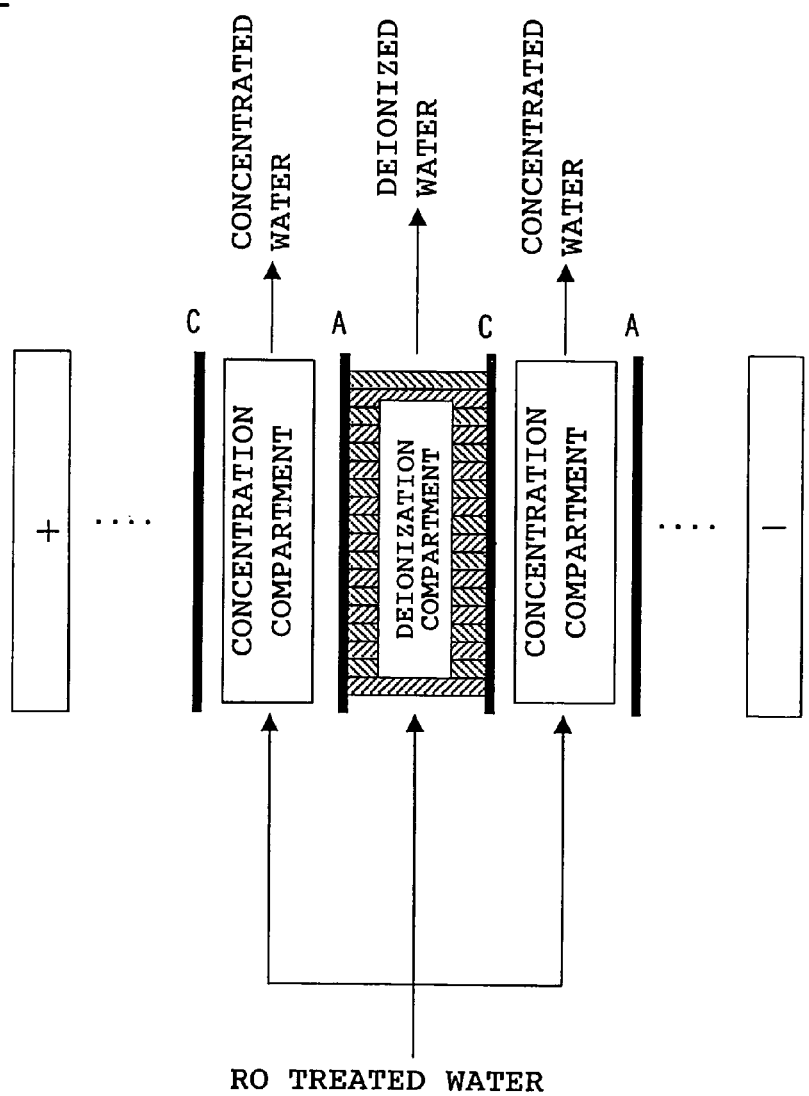
FIG. 2 is a conceptual drawing showing the constitution of an electrical deionization apparatus according to an embodiment of the present invention.

FIG. 2 is a conceptual drawing showing an example of the constitution of an electrical deionization apparatus according to an embodiment of the present invention. Anion-exchange membranes A and cation-exchange membranes C are arranged between a cathode (−) and an anode (+), thus forming concentration compartments and deionization compartments. Moreover, the compartments contacting the electrodes are called as electrode compartments. As should be clear to a person skilled in the art, each of the electrode compartments has the function of a deionization compartment or a concentration compartment also. In general, the outermost concentration compartments often serve as the electrode compartments. Note that, for example, as to the apparatus shown in FIG. 2, in the case that the electrodes are disposed in the concentration compartments on both sides of the central deionization compartment, i.e. in the case that only three compartments, that is concentration compartment, deionization compartment and concentration compartment are formed between the anode and the cathode, the concentration compartments on both sides also work as an electrode compartment. It should thus be clear to a person skilled in the art that an apparatus having this constitution is also included in the scope of an electrical deionization apparatus having deionization compartments, concentration compartments and electrode compartments' defined in the claims of the present application.

Figure 8:
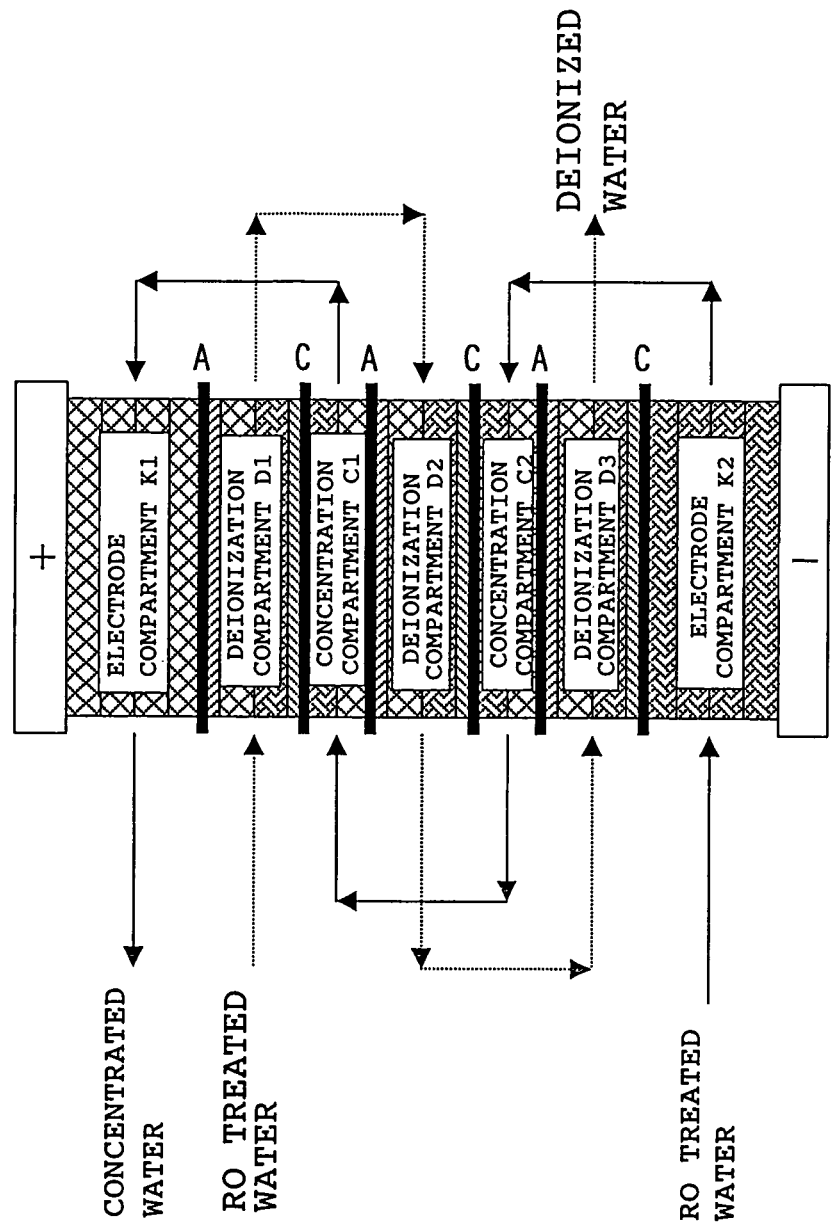
FIG. 8 is a conceptual drawing showing the constitution of an electrical deionization apparatus according to prior art used in Comparative Example 1.

In each deionization compartment formed by an anion-exchange membrane on the anode side and a cation-exchange membrane on the cathode side, a fibrous material having a cation-exchange function (called a cation-exchange fibrous material) and a fibrous material having an anion-exchange function (called an anion-exchange fibrous material) are formed a laminate structure so as to intersect the direction of flow of water to be treated (the water-passing direction). That is, in a conventional electrical deionization apparatus, when packing sheet materials such as ion-conducting spacers or ion-exchange fibrous materials into a deionization compartment or concentration compartment, as shown in FIG. 8, they have been packed along the direction of flow of the water to be treated (the water-passing direction), i.e. parallel to the ion-exchange membranes forming the compartments, but in the electrical deionization apparatus according to the present invention, in each deionization compartment, the ion-exchange fibrous materials are packed in, in a direction intersecting the direction of flow of the water to be treated (the water-passing direction), and intersecting the ion-exchange membranes forming the compartments. The ion-exchange fibrous materials are preferably laminated in the above direction, and as shown in FIG. 2, it is further preferable for cation-exchange fibrous material layers and anion-exchange fibrous material layers to be alternately laminated.

In an electrical deionization apparatus having such a constitution, because the anion-exchange fibrous material and the cation-exchange fibrous material are laminated and intersecting the direction of flow of the water to be treated, all of the water to be treated passes through the fibrous materials when flowing through from one surface of the fibrous material to the other surface of the fibrous material. The water to be treated can thus be sufficiently fed to the whole of each of the ion-exchange fibrous materials having numerous usable ion exchange groups, and hence these ion-exchange groups can be utilized effectively. As a result, the number of available ion-exchange groups per unit length of each deionization compartment (in the direction of flow of the water to be treated) is greatly increased, and hence the length of each deionization compartment can be made shorter than of conventional one. As to ion-exchange fibrous materials, there is a problem of pressure loss as described earlier, but in the electrical deionization apparatus according to the present invention, because the length of each deionization compartment in the direction of flow of the water to be treated can be made much shorter than of conventional one in this way, increase of the pressure loss of the water to be treated does not become a problem in practice.

Moreover, according to the present invention, contact places between the anion exchanger and the cation exchanger in each deionization compartment, i.e. sites where water dissociation occurs, are formed over the whole of the cross section of the flow of the water to be treated, and hence much of the water to be treated is fed to places where water dissociation occurs, and thus regeneration of the ion exchangers by water dissociation and decomposition of TOC and weak electrolytes such as silica can be promoted. To attain such an objective, it is preferable for the anion-exchange fibrous material and the cation-exchange fibrous material packed into each deionization compartment to contact with each other.

Note that in the present invention it is important for at least one of an anion-exchange fibrous material and a cation-exchange fibrous material to be disposed intersecting the direction of flow of the water to be treated. For example, even by disposing an anion-exchange fibrous material in a plurality of layers intersecting the direction of flow of the water to be treated and packing cation-exchange resin beads or the like between the anion-exchange fibrous material layers, the effects of the present invention can be obtained, and hence such a constitution is included in the present invention. Alternatively, a constitution may be adopted in which both parts where an anion-exchange fibrous material is disposed in a plurality of layers intersecting the direction of flow of the water to be treated and cation-exchange resin beads or the like are packed between these anion-exchange fibrous material layers, and where a cation-exchange fibrous material is disposed in a plurality of layers intersecting the direction of flow of the water to be treated and anion-exchange resin beads or the like are packed between these cation-exchange fibrous material layers exist in the deionization compartments.

In the present invention, it is preferable that in each deionization compartment, an anion-exchange fibrous material disposed laminatedly intersecting the direction of flow of the water to be treated contacts an anion-exchange membrane forming that deionization compartment contact, and/or a cation-exchange fibrous material disposed laminatedly intersecting the direction of flow of the water to be treated contacts a cation-exchange membrane forming that deionization compartment contact. That is, with the constitution shown in FIG. 2, it is preferable that the anion-exchange fibrous material disposed in the deionization compartment contacts with the anion-exchange membrane (A), and/or the cation-exchange fibrous material disposed in the deionization compartment contacts with the cation-exchange membrane (C). By adopting such a constitution, ions to be removed in the water to be treated adsorbed by ion exchange by an ion-exchange fibrous material will migrate along the ion-exchange fibrous material to the ion-exchange membrane, pass through the ion-exchange membrane, and migrate into the adjacent concentration compartment. The ions to be removed adsorbed on an ion exchanger can thus migrate to an ion-exchange membrane along continued solid phase (ion exchanger) without desorbing out into the liquid phase.

Moreover, in the present invention, it is preferable for at least one of an anion-exchange fibrous material and a cation-exchange fibrous material disposed in each deionization compartment to be disposed so as to contact an anion-exchange membrane and a cation-exchange membrane. As to the form shown in FIG. 2, the anion-exchange fibrous material and the cation-exchange fibrous material contact the anion-exchange membrane and the cation-exchange membrane forming the deionization compartment. By adopting such a constitution, for example the points of contact between the anion-exchange fibrous material and the cation-exchange membrane (C) function as places where water dissociation occurs. $OH^-$ ions generated by the water dissociation at these places will migrate from the anion-exchange groups to the anion-exchange groups of the anion-exchange fibrous material toward the anode while regenerating. The $OH^-$ ions generated by the water dissociation thus regenerate while migrating from one edge of the deionization compartment to the other, so regeneration is very efficient. Likewise for the $H^+$ ions generated at the points of contact between the anion-exchange membrane (A) and the cation-exchange fibrous material.

Figure 3:
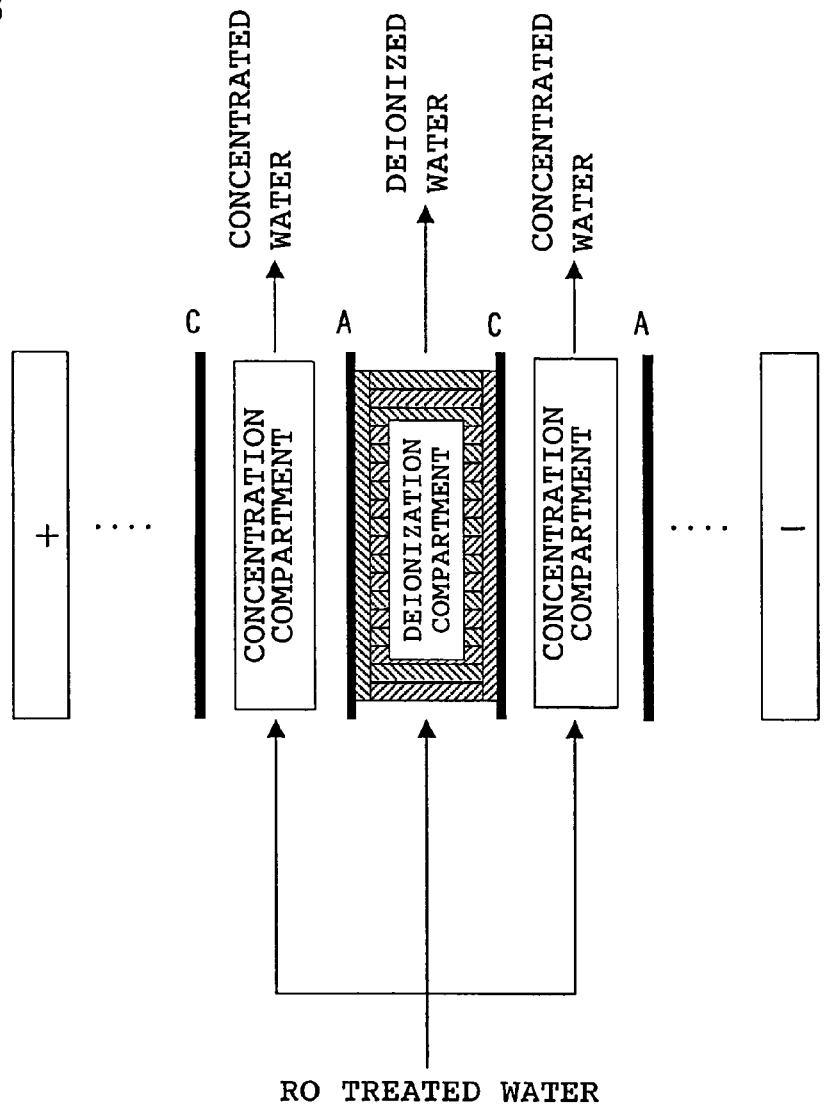
FIG. 3 is a conceptual drawing showing the constitution of an electrical deionization apparatus according to another embodiment of the present invention.

Furthermore, in the present invention, as shown in FIG. 3, it is preferable for an anion-exchange fibrous material to be disposed along the surface of the anion-exchange membrane and/or for a cation-exchange fibrous material to be disposed along the surface of the cation-exchange membrane in each deionization compartment. In the case that such ion-exchange fibrous material layers are not disposed along the surfaces of the ion-exchange membranes, contact between each ion-exchange fibrous material disposed laminatedly intersecting the direction of flow of the water to be treated and the ion-exchange membranes disposed along the direction of flow of the water to be treated is done only at end parts of the ion-exchange fibrous material, and hence this contact is not intimate, and thus a problem of the ion conductivity is lowered, and this may increase an operating voltage. However, according to the form shown in FIG. 3, this problem can be resolved.

Moreover, in the present invention, in each deionization compartment, it is preferable for anion-exchange fibrous material layers and cation-exchange fibrous material layers disposed intersecting the direction of flow of the water to be treated to be laminated alternately and moreover as numerous as possible. A large number of anion-exchange fibrous material layers and cation-exchange fibrous material layers are laminated alternately, then the previously mentioned condition making the water to be treated contact a cation exchanger and an anion exchanger alternately as many times as possible can be satisfied, and hence the removal of the ions to be removed from the water to be treated by ion exchange can be carried out more completely. Moreover, a large number of cation-exchanger layers and anion-exchanger layers are laminated alternately, then a large number of contact places between the anion exchanger and the cation exchanger, i.e. places where water dissociation occurs, can be formed throughout the whole of the deionization compartment, and hence regeneration of the ion exchangers and decomposition of TOC components, silica and so on can be carried out very efficiently.

In the electrical deionization apparatus according to the present invention, there are no particular limitations on the constitution of the concentration compartments or the electrode compartments, but it is preferable for ion exchangers to also be packed into these concentration compartments and/or electrode compartments. As to the ion exchangers packed into the concentration compartments and/or electrode compartments, any materials that have been proposed for use in electrical deionization apparatuses can be used. For example, ion-exchange fibrous materials that have been given an ion-exchange function like those packed into the deionization compartments or the like can be used as ion exchangers packed into the electrode compartments, and furthermore ion-conducting spacers of a form such as an oblique net that has been given ion-conductive as disclosed in WO 99/48820 or the like can be used as ion exchangers packed into the concentration compartments and/or electrode compartments. Moreover, spacers of a form such as an oblique net that has not been given ion-conductive can be packed into the concentration compartments and/or electrode compartments.

Moreover, followings are included as structures of the electrical deionization apparatus according to the present invention. i) An electrical deionization apparatus in which a plurality of deionization compartments and concentration compartments are disposed alternately, wherein a deionization compartment having the basic structure of the present invention is provided. ii) An electrical deionization apparatus in which, in a deionization compartment, anion-exchange fibrous material layers and/or cation-exchange fibrous material layers are disposed laminatedly and intersecting the direction of flow of the water to be treated, and at least one layer of other ion exchanger is inserted therebetween. iii) An electrical deionization apparatus in which, in a deionization compartment, anion-exchange fibrous material layers and/or cation-exchange fibrous material layers are disposed on laminatedly, and at least one of these layers is a composite of the anion-exchange fibrous material or a cation-exchange fibrous material, and another ion exchanger.

Moreover, at contact places between the cation exchanger and the anion exchanger in each deionization compartment in the electrical deionization apparatus, the cation-exchange groups and the anion-exchange groups will bind, and the anion exchanger and the cation exchanger will bind together more strongly as the operating time elapses. In the case of the electrical deionization apparatus according to the present invention, the ion exchangers are disposed intersecting the direction of flow of the water to be treated in each deionization compartment, i.e. the ion exchangers are disposed intersecting the ion-exchange membranes forming each deionization compartment, to prevent the water to be treated flowing preferentially between each ion-exchange membrane and the ion exchangers packed in, it is necessary to bond the ion-exchange membranes and the ion exchangers together strongly at the contact places therebetween. In the case of the electrical deionization apparatus according to the present invention, it is thus desirable to carry out the operation at a low flowrate (e.g. $SV<100\,h^{-1}$) during startup operation, thus forming bonds between the anion exchanger and the cation-exchange membrane and between the anion-exchange membrane and the cation exchanger in each deionization compartment, and then carry out normal operation at an increased flowrate. Furthermore, to maintain the bonding between the ion-exchange membranes and the ion exchangers in each deionization compartment for a long time, it is further desirable to keep the pressure in each concentration compartment and the pressure in each deionization compartment approximately the same so that the ion-exchange membranes and the ion exchangers do not peel away from each other.

As to ion-exchange fibrous materials that can be used in the electrical deionization apparatus according to the present invention, ones obtained by introducing ion-exchange groups onto a polymeric fibrous substrate by graft polymerization can be preferably used. The grafted substrate made of the polymeric fibers may be made of single fibers such as a polyolefin polymer, for example polyethylene or polypropylene, or may be made of composite fibers in which the axial core and the sheath are made of different polymers. Examples of composite fibers that can be used are composite fibers having a core-sheath structure in which a polyolefin, for example polyethylene, is taken as a sheath component, and a polymer other than that used for the sheath component, for example polypropylene, is taken as a core component. Such a composite fibrous material into which ion-exchange groups have been introduced using radiation-induced graft polymerization has excellent ion-exchange ability, and can be manufactured its thickness uniformly, and hence is preferable as an ion-exchange fibrous material used in the present invention. Examples of forms of the ion-exchange fibrous material include a woven fabric and a nonwoven fabric.

Moreover, as an ion-conducting spacer that can be used in the electrical deionization apparatus according to the present invention, as a substrate an oblique net made of a polyolefin polymer resin, for example polyethylene as used in conventional electrodialysis tanks, having been given an ion-exchange function using radiation-induced graft polymerization, is preferable since the ion conductivity is excellent and dispersibility of the water to be treated is excellent.

Each of the ion-exchange fibrous materials, ion-conducting spacers and so on used in the electrical deionization apparatus according to the present invention is preferably manufactured using radiation-induced graft polymerization. Radiation-induced graft polymerization is a method in which the polymeric substrate is irradiated with radiation to form radicals, and a monomer is reacted with these radicals, thus introducing the monomer into the substrate.

Examples of radiation that can be used in the radiation-induced graft polymerization include α rays, β rays, gamma rays, electron beams, and ultraviolet rays, but for the present invention gamma rays and electron beams are preferably used. As to radiation-induced graft polymerization, there are a pre-irradiation graft polymerization method in which the substrate is irradiated with radiation in advance and then the grafted substrate is made to contact the grafting monomer to bring about reaction, and a simultaneous irradiation graft polymerization method in which irradiation by radiation is carried out under the coexistence of the substrate and the monomer; in the present invention, either method can be used. Moreover, according to the method of contacting the monomer and the substrate, there are a liquid phase graft polymerization method in which polymerization is carried out with the substrate immersed in a monomer solution, a vapor phase graft polymerization method in which polymerization is carried out by contacting the substrate and a vapor of the monomer, an impregnation vapor phase graft polymerization method in which the substrate is immersed in a monomer solution and is then taken out from the monomer solution and is reacted in a vapor phase, and so on; any of these methods can be used in the present invention.

Without any particular limitations on the ion-exchange groups introduced into each spacer substrate or fibrous substrate such as a nonwoven fabric, it is possible to use any of various cation-exchange groups or anion-exchange groups. For example, as cation-exchange groups, strongly acidic cation-exchange groups such as sulfonic acid groups, moderately acidic cation-exchange groups such as phosphoric acid groups, or weakly acidic cation-exchange groups such as carboxyl groups can be used, and as anion-exchange groups, weakly basic anion-exchange groups such as primary to tertiary amino groups, or strongly basic anion-exchange groups such as quaternary ammonium groups can be used; alternatively, an ion exchanger having both cation-exchange groups and anion-exchange groups as above can be used.

Each of these various types of ion-exchange groups can be introduced into the fibrous substrates or spacer substrates by graft polymerization, preferably radiation-induced graft polymerization, using a monomer having the ion-exchange groups, or by graft polymerization using a polymerizable monomer having groups that can be converted into the ion-exchange groups, and then these groups can be possible to be introduced into the fibrous substrates or spacer substrates by converting these groups into the ion-exchange groups. Examples of monomers having ion-exchange groups that can be used with this objective include acrylic acid (AAc), methacrylic acid, sodium styrenesulfonate (SSS), sodium methallylsulfonate, sodium allylsulfonate, sodium vinylsulfonate, vinylbenzyl trimethyl ammonium chloride (VBTAC), diethylaminoethyl methacrylate, and dimethylaminopropyl acrylamide. For example, by carrying out radiation-induced graft polymerization using sodium styrenesulfonate as a monomer, sulfonic acid groups, which are strongly acidic cation-exchange groups, can be directly introduced into a substrate; by carrying out radiation-induced graft polymerization using vinylbenzyl trimethyl ammonium chloride as a monomer, quaternary ammonium groups, which are strongly basic anion-exchange groups, can be directly introduced into a substrate. Moreover, examples of monomers having groups that can be converted into ion-exchange groups include acrylonitrile, acrolein, vinylpyridine, styrene, chloromethylstyrene, and glycidyl methacrylate (GMA). For example, by introducing glycidyl methacrylate into a substrate by radiation-induced graft polymerization, and then reacting with a sulfonating agent such as sodium sulfite, sulfonic acid groups, which are strongly acidic cation exchange groups, can be introduced into the substrate; by graft-polymerizing chloromethylstyrene into a substrate, and then immersing the substrate in a trimethylamine aqueous solution to convert into quaternary ammonium groups, quaternary ammonium groups, which are strongly basic anion exchange groups, can be introduced into the substrate.

In FIGS. 2 and 3, examples were shown in which the electrical deionization apparatus according to the present invention is constituted by laminating sheet-shaped ion-exchange fibrous materials in a deionization compartment in a direction intersecting the direction of flow of the water to be treated, i.e. crossways; however, electrical deionization apparatuses according to the present invention can also be constituted using other ion-exchange fibrous material packing methods such as the following.

Figure 4:
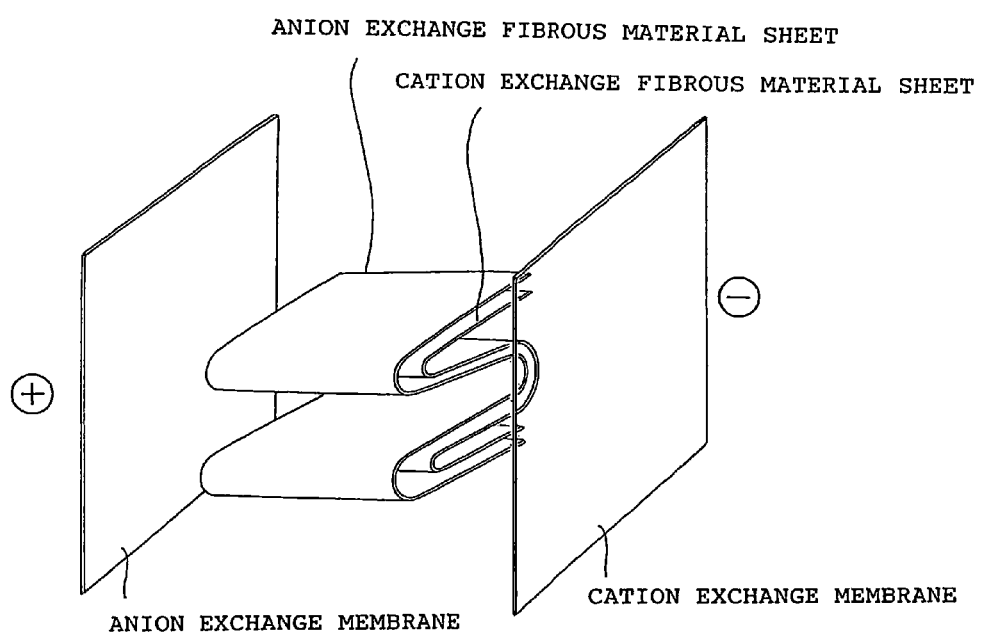
FIG. 4 is a conceptual drawing showing the constitution of a deionization compartment of an electrical deionization apparatus according to another embodiment of the present invention.
Figure 5:
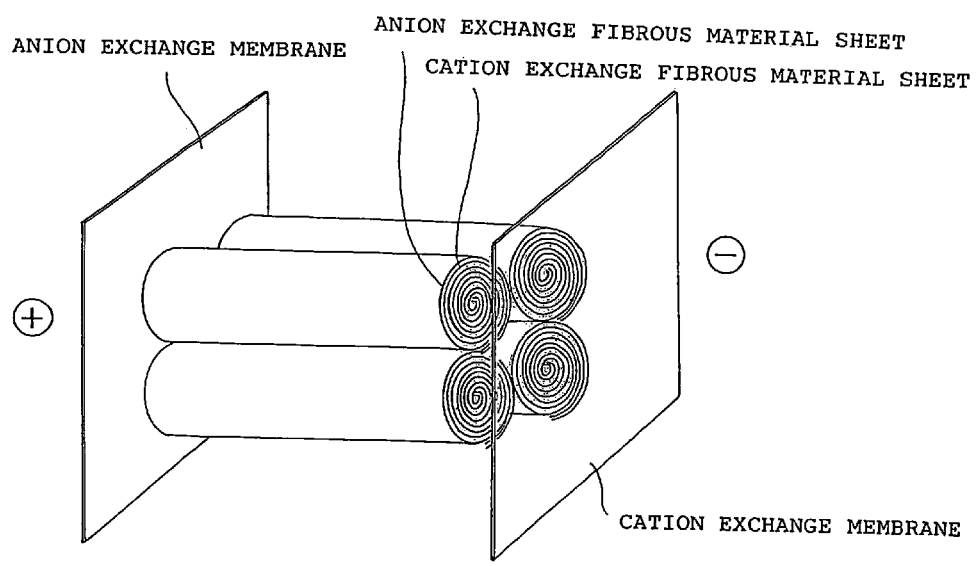
FIG. 5 is a conceptual drawing showing the constitution of a deionization compartment of an electrical deionization apparatus according to another embodiment of the present invention.

First, as shown in FIG. 4, an electrical deionization apparatus according to the present invention can be constituted by putting a long sheet-like anion-exchange fibrous material and a long sheet-like cation-exchange fibrous material on one another, folding the resulting fibrous materials in accordance with the width of the deionization compartment so as to form a pleated ion-exchange fibrous material, and packing this pleated fibrous materials into the deionization compartment such that the surfaces of the pleats intersect the water-passing direction, and moreover the both ends of the pleats contact respectively the cation-exchange membrane and the anion-exchange membrane forming the deionization compartment. Moreover, as shown in FIG. 5, an electrical deionization apparatus according to the present invention can be constituted by putting a long sheet-shaped anion-exchange fibrous material and a long sheet-shaped cation-exchange fibrous material on one another and rolling up the fibrous materials, and packing one or a plurality of rolls thus produced into the deionization compartment such that the both ends of each roll contact respectively the cation-exchange membrane and the anion-exchange membrane forming the deionization compartment. As to the electrical deionization apparatuses of the forms shown in FIGS. 4 and 5, anion-exchange fibrous material layers and cation-exchange fibrous material layers are disposed laminatedly intersecting the direction of flow of the water to be treated, and hence these forms are included in the scope of the electrical deionization apparatus of the present invention. Note that with these forms, as shown in FIG. 3, an anion-exchange fibrous material is disposed along the surface of the anion-exchange membrane forming the deionization compartment and/or a cation-exchange fibrous material is disposed along the surface of the cation-exchange membrane forming the deionization compartment, and then the contact between the ion exchangers packed into the deionization compartment and the ion-exchange membranes forming the deionization compartment can be stronger.

As to the ion-exchange membranes used in constituting the electrical deionization apparatus according to the present invention, for example Neosepta CMX (Tokuyama Corporation) or the like can be used for each cation-exchange membrane, and for example Neosepta AMX (Tokuyama Corporation) or the like can be used for each anion-exchange membrane.

Due to the constitution described above, as to the electrical deionization apparatus according to the present invention, the following effects are obtained, and the deionization efficiency of the electrical deionization apparatus can be greatly improved, and downsizing of the electrical deionization apparatus can be made. The water to be treated can be made to contact the cation exchanger and the anion exchanger completely alternately in many stages.

1. Because the fibrous material layers having an ion-exchange function are constituted from fibers and the fiber diameter is small, the migration length in solid phase for the ions is short, and moreover the surface area is large, and the frequency of contact between the ions to be removed and the functional groups is high, and hence the time taken for the ion-exchange reactions to reach equilibrium is short, and moreover the neutralization reactions are readily completed.

2. Because the fibrous material layers having a cation-exchange function and the fibrous material layers having an anion-exchange function closely contact the cation-exchange membrane and the anion-exchange membrane respectively, and ion exchangers of the same type are packed continuously in the electrode direction as though cutting across each deionization compartment, ions to be removed that have been adsorbed into the solid phase by ion exchange and $H^+$ ions and $OH^-$ ions generated by water dissociation migrate through the solid phase readily, and are thus carried into a concentration compartment without desorbing out into the liquid phase 3. As contact places between a cation exchanger and an anion exchanger, there are provided contact places between the cation-exchange membrane and the anion-exchange fibrous material layers, contact places between the anion-exchange membrane and the cation-exchange fibrous material layers, and contact places between the cation-exchange fibrous material layers and the anion-exchange fibrous material layers. Moreover, it is though that in the case of packing the ion-exchange fibrous materials laminatedly and alternately, most of the water dissociation occurs at the contact places between the cation-exchange fibrous material layers and the anion-exchange fibrous material layers. Much of the water to be treated thus flows through the places where water dissociation occurs, and ionization of TOC components and weak electrolytes is promoted at the places where water dissociation occurs, and hence removal of the TOC components and weak electrolyte components can be increased.

Due to the above-described principles, as to the electrical deionization apparatus according to the present invention, for example in the case of feeding the water equivalent of RO treated water at 10 Lh$^{-1}$ as the water to be treated, at an SV (spatial velocity: speed of feeding water to be treated divided by total deionization compartment volume) of 200 h$^{-1}$ and an operating current of 0.4 A, treated water having a specific resistance of approximately 18.0 MΩcm, a TOC concentration of not more than 10 ppb, and a silica concentration of not more than 30 ppb can be stably obtained.

By adopting the constitution of the present invention as described above in which at least one of anion-exchange fibrous material layers and cation-exchange fibrous material layers are disposed laminatedly intersecting the direction of flow of the water to be treated in each deionization compartment, the deionization efficiency per the volume of the deionization compartment can be remarkably improved, and hence the width of the electrical deionization apparatus can be made much smaller than with a conventional electrical deionization apparatus.

However, due to subsequent studies by the present inventors, it has been found out that when an electrical deionization apparatus of reduced size as described above is operated for a long time, then, particularly in the case that the water to be treated contains much calcium and carbonate, i.e. is hard water, a strong tendency may be observed that the operating voltage increases with time. It is thought that this is because the calcium ions and carbonate ions in the water to be treated are introduced from a deionization compartment into an adjacent concentration compartment and thus concentrated in the concentration compartment, whereby calcium carbonate is deposited as crystals, and this calcium carbonate acts as an insulator and thus obstructs the current of electricity, and hence the operating voltage increases. This phenomenon has also been observed to occur in conventional electrical deionization apparatuses, but because the apparatus is large, the electrodes have a large area, and hence the current density is low, and thus calcium carbonate is deposited only thinly over the whole of the concentration compartment and hence dissolves into the water; it is thought that this is why serious problems have not often been caused by deposition of calcium carbonate crystals. However, owing to the present invention, it is though that this problem may become more apparent as the deionization apparatus is greatly reduced in size.

Examining this phenomenon of deposition of calcium carbonate crystals in the concentration compartments, first of all, calcium carbonate is deposited at contact interfaces of the anion exchanger and cation exchanger in each concentration compartment. The calcium carbonate produced has low solubility, and hence deposits as crystals, and then the crystal particles produced act as crystal nuclei, whereby the deposition of crystals proceeds. Taking note of the mechanism of this deposition of calcium carbonate crystals, the present inventors realized that if contact interfaces of the anion exchanger and cation exchanger where the calcium carbonate is produced are spreaded out the whole of each concentration compartment, then even if calcium carbonate is produced, the calcium carbonate will not deposit as crystals, and hence it will be possible to carry out the deionization operation stably. The present inventors thus realized that by adopting the constitution of the present invention used in the deionization compartments as described above to the concentration compartments as well, contact interfaces of the anion exchanger and cation exchanger in each concentration compartment could be spread out the whole of the concentration compartment; the present inventors thus complete a second preferable embodiment of the present invention.

That is, the second preferable embodiment of the present invention is characterized in that in each concentration compartment in the electrical deionization apparatus, at least one of anion-exchange fibrous material layers and cation-exchange fibrous material layers are disposed laminatedly intersecting the water-passing direction.

In the second embodiment of the present invention, regarding the method of packing the ion-exchange fibrous materials into each concentration compartment and the water-passing method, any of the various forms described above with reference to FIGS. 2 to 5 with regard to the method of packing the ion-exchange fibrous materials into each deionization compartment and the water-passing method can be adopted.

Furthermore, through further studies, the present inventors discovered that the operating voltage can be more stable by disposing ion-exchange fibrous materials laminatedly intersecting the water-passing direction in the electrode compartments as well. It is known that in the electrode compartments, particularly in the cathode compartment, the voltage across the both ends of the compartment increases with operating time. The present inventors examined this phenomena, and concluded that the reason for this is that OH$^-$ ions are generated by electrolysis of water on the surface of the electrode, and these OH$^-$ ions bond to calcium ions in the passing water to produce calcium hydroxide, which is deposited on the surface of the electrode to form an insulating film, whereby the electrical resistance increases. Consequently, in the electrode compartments, particularly in the cathode compartment, if an ion-exchange fibrous material is disposed laminatedly in a direction intersecting the water-passing direction, then the contact area between the electrode and the passing water can be greatly increased, and hence eccentrically-location of the calcium hydroxide produced can be prevented, but rather the calcium hydroxide can be spread out the whole of the electrode compartment, and hence deposition of calcium hydroxide crystals in the electrode compartment can be suppressed, and as a result an increase in the voltage difference across the electrode compartment can be suppressed. Moreover, it is thought that an increase in the voltage across the both ends of the cathode compartment also occurs for the following reasons. In the case that an ion exchanger is packed into the cathode compartment, an anion exchanger is normally used. The anion-exchange groups, for example quaternary ammonium groups (R—N$^+$(CH$_3$)$_3$) are positively charged, and hence are attracted to the electrode (cathode). At the electrode, reduction reaction of water $$2H^+ + 2e^- \rightarrow H_2 \uparrow$$

i.e. electrolysis of water normally occurs, but it is thought that the quaternary ammonium groups are also reduced at the same time.

$$2R\text{—}N^+(CH_3)_3 + 2e^- \rightarrow 2R\text{—}CH_3 + 2C_2H_6 + N_2 \uparrow$$

The quaternary ammonium groups are reduced, then the ion-exchange function is lost and become an insulator, and hence the voltage across the both ends of the electrode compartment increases. In a conventional electrical deionization apparatus, an ion-conducting spacer has been used as an ion exchanger packing into an electrode compartment, and hence it is thought that the electrode and the ion exchanger contact one another by so-called point contact, and thus the current of electricity is obstructed by the anion-exchange groups being insulated as described above, whereby the increase in the voltage across the both ends of the electrode compartment becomes marked. However, according to a third embodiment of the present invention, an anion-exchange fibrous material is disposed laminatedly in a direction intersecting the water-passing direction in the cathode compartment in particular, whereby the contact area between the cathode and the anion exchanger in the cathode compartment is greatly increased by so-called surface contact; the anion-exchange groups being insulated at part of the contact surface will thus not have a sufficiently large effect as to bring about an increase in the voltage across the both ends of the electrode compartment, and as a result an increase in the voltage across the both ends of the electrode compartment can be suppressed. Accordingly, this further preferable third embodiment of the present invention is thus characterized in that at least one of anion-exchange fibrous material layers and cation-exchange fibrous material layers are disposed laminatedly intersecting the water-passing direction in an electrode compartment in the electrical deionization apparatus. In the third embodiment of the present invention, it is particularly preferable for an anion-exchange fibrous material to be disposed laminatedly intersecting the water-passing direction in the cathode compartment.

In the third embodiment of the present invention, in particular, it is preferable for an ion-exchange fibrous material, particularly preferably a cation-exchange fibrous material, to be disposed laminatedly intersecting the water-passing direction in the cathode compartment. Regarding the method of packing the ion-exchange fibrous material and the water-passing method, any of the various forms described above with reference to FIGS. 2 to 5 with regard to the method of packing the ion-exchange fibrous materials into each deionization compartment and the water-passing method can be adopted. Note, however, that in the case of the cathode compartment, the compartment is formed by the cathode and normally an anion-exchange membrane, and the anion-exchange fibrous material disposed laminatedly in the cathode compartment can be disposed so as to contact at least one of the anion-exchange membrane and the cathode forming the compartment, or can disposed so as to contact both of the anion-exchange membrane and the cathode forming the compartment; furthermore, in the cathode compartment, an anion-exchange fibrous material can be disposed along the surface of the anion-exchange membrane and/or the cathode forming the cathode compartment.

The characteristic features of the various embodiments of the present invention described above may be adopted in combination, or single. That is, in the electrical deionization apparatus according to the present invention, the compartment(s) in which an ion-exchange fibrous material is disposed laminatedly intersecting the water-passing direction may be any one of the deionization compartments, the concentration compartments and the electrode compartments, or may be the deionization compartments and the concentration compartments, or the deionization compartments and the electrode compartments, or the concentration compartments and the electrode compartments, or all of the deionization compartments, the concentration compartments and the electrode compartments. Moreover, as already described above, an ion-exchange fibrous material may be disposed laminatedly intersecting the water-passing direction in only some of the deionization compartments, or only some of the concentration compartments, or only one of the electrode compartments.

In the above embodiments in which an ion-exchange fibrous material is disposed laminatedly intersecting the direction of flow of the water to be treated in at least one compartment out of the deionization compartments and the concentration compartments have been described; however, any water-permeable porous material that has been given ion-exchange ability and has approximately the same amount of usable ion-exchange groups and approximately the same water permeability as such an ion-exchange fibrous material can be disposed in a deionization compartment instead of, or in combination with, the ion-exchange fibrous material, and the effects of the present invention can also be produced through this form. That is, another form of the present invention relates to an electrical deionization apparatus having deionization compartments and concentration compartments partitioned from one another by a plurality of ion-exchange membranes between a cathode and an anode, the electrical deionization apparatus, wherein in at least one compartment out of the deionization compartments and the concentration compartments, water-permeable porous material layers that have been given an ion-exchange function are disposed laminatedly intersecting the direction of flow of the water to be treated.

Examples of water-permeable porous materials that can be used in this embodiment of the present invention include porous substrates having therein communicating cavities. A porous substrate having therein communicating cavities means any structure having therein cavities so as to pass through the inside of the substrate from one surface thereof to the other surface thereof on the opposite side; such structures include, for example, open-cell foams made of an olefinic synthetic resin such as polyethylene or polypropylene, natural open-cell foams such as sponges, and three-dimensional woven fabrics comprising a plain weave fabric in which fibers are woven in a longitudinal direction and a transverse direction, with fibers further woven in the thickness direction. Out of these, a polyolefinic open-cell foam such as a polyethylene-type porous body or a polypropylene-type porous body can be preferably used, and as a three-dimensional woven fabric, a polyolefinic three-dimensional woven fabric in which polyethylene fibers, polypropylene fibers or the like are woven in three dimensions can be preferably used. Such a material into which ion-exchange groups have been introduced can be disposed laminatedly in a direction intersecting the direction of flow in each deionization compartment.

A porous substrate having therein communicating cavities that can be used with the above objective preferably has a void fraction of 93 to 96%, a mean pore diameter of 0.6 to 2.6 mm, and a specific surface area of 21000 to 38000 $m^2/m^3$, particularly preferably approximately 30000 $m^2/m^3$. Moreover, the porous substrate must function as a substrate into which ion exchange groups are introduced, and thus preferably comprises a polyolefin-type polymer, for example polyethylene, polypropylene, or a composite thereof. Specifically, a polyethylene-type porous body having a void fraction of 93 to 96%, a mean pore diameter of 0.6 to 2.6 mm, and a specific surface area of approximately 30000 $m^2/m^3$ (made by Sekisui Chemical Co., Ltd.) can be particularly preferably used. In the present invention, by using an ion exchanger obtained by introducing ion-exchange groups into such a porous substrate having therein communicating cavities, and disposing this ion-exchanger laminatedly intersecting the direction of flow of the water to be treated, the water to be treated can be made to pass through the ion exchanger without being obstructed, and hence the water to be treated can be made to contact the ion exchanger sufficiently without keeping the supply pressure of the water to be treated high.

The introduction of the ion-exchange groups into the water-permeable porous material as described above can be carried out using radiation-induced graft polymerization as described earlier. The introduction of the ion-exchange groups is preferably carried out such that the salt dissociation capacity is 2.8 to 3.3 meq/g in the case of an anion exchanger, and 2.7 to 3.0 meq/g in the case of a cation exchanger. The salt dissociation capacity of the ion exchanger is within such a range, then there will be many ion-exchange groups that can contact the ions in the water to be treated, and hence a good ion-exchange function can be obtained.

Regarding a water-permeable porous material that has been given an ion-exchange function as described above, again the compartment(s) in which this material is disposed may be any one of the deionization compartments, the concentration compartments and the electrode compartments, or may be the deionization compartments and the concentration compartments, or the deionization compartments and the electrode compartments, or the concentration compartments and the electrode compartments, or all of the deionization compartments, the concentration compartments and the electrode compartments. Moreover, as already described above, the water-permeable porous material that has been given an ion-exchange function may be disposed in only some of the deionization compartments, or only some of the concentration compartments, or only one of the electrode compartments.

Various embodiments of the present invention are as follows.

1. An electrical deionization apparatus having deionization compartments, concentration compartments and electrode compartments partitioned from one another by a plurality of ion-exchange membranes between a cathode and an anode, wherein in at least one compartment out of the deionization compartments, the concentration compartments and the electrode compartments, at least one of anion-exchange fibrous material layers and cation-exchange fibrous material layers are disposed laminatedly intersecting a water-passing direction.

2. The electrical deionization apparatus according to above item 1, wherein in at least one compartment out of the deionization compartments and the concentration compartments, the anion-exchange fibrous material disposed laminatedly in that compartment and an anion exchange membrane forming that compartment are disposed so as to contact one another, and/or the cation-exchange fibrous material disposed laminatedly in that compartment and a cation-exchange membrane forming that compartment are disposed so as to contact one another.

3. The electrical deionization apparatus according to above item 1, wherein in at least one compartment out of the deionization compartments and the concentration compartments, at least one of the anion-exchange fibrous material disposed laminatedly in that compartment and the cation-exchange fibrous material disposed laminatedly in that compartment is disposed so as to contact both an anion-exchange membrane and a cation-exchange membrane forming that compartment.

4. The electrical deionization apparatus according to above item 1, wherein in at least one compartment out of the deionization compartments and the concentration compartments, an anion-exchange fibrous material is disposed along the surface of an anion-exchange membrane, and/or a cation-exchange fibrous material is disposed along the surface of a cation-exchange membrane.

5. The electrical deionization apparatus according to any one of above items 1 through 4, wherein in at least one compartment out of the deionization compartments and the concentration compartments, a plurality of anion-exchange fibrous material layers and cation-exchange fibrous material layers are disposed laminatedly and alternately intersecting the water-passing direction.

6. The electrical deionization apparatus according to any one of above items 1 through 5, wherein each of the anion-exchange fibrous material and the cation-exchange fibrous material is a woven fabric or nonwoven fabric material.

7. The electrical deionization apparatus according to any one of above items 1 through 6, wherein at least one of the anion-exchange fibrous material and the cation-exchange fibrous material is a material obtained by introducing ion-exchange groups into a substrate using radiation-induced graft polymerization.

8. The electrical deionization apparatus according to any one of above items 1 through 7, wherein the anion-exchange fibrous material or the cation-exchange fibrous material is disposed in at least some of the deionization compartments.

9. The electrical deionization apparatus according to any one of above items 1 through 7, wherein the anion-exchange fibrous material or the cation-exchange fibrous material is disposed in at least some of the concentration compartments.

10. The electrical deionization apparatus according to any one of above items 1 through 9, wherein the anion-exchange fibrous material or the cation-exchange fibrous material is disposed in at least some of the electrode compartments.

11. The electrical deionization apparatus according to any one of above items 1 through 7, wherein the anion-exchange fibrous material or the cation-exchange fibrous material is disposed in at least some of the deionization compartments and at least some of the concentration compartments.

12. The electrical deionization apparatus according to above item 11, wherein the anion-exchange fibrous material or the cation-exchange fibrous material is disposed in at least some of the electrode compartments.

13. The electrical deionization apparatus according to above item 10 or 12, wherein layers of the anion-exchange fibrous material are disposed in a cathode compartment.

14. The electrical deionization apparatus according to above item 13, wherein in the cathode compartment, the anion-exchange fibrous material disposed laminatedly in the cathode compartment is disposed so as to contact at least one of an anion-exchange membrane and a cathode forming the cathode compartment.

15. The electrical deionization apparatus according to above item 13, wherein in the cathode compartment, the anion-exchange fibrous material disposed laminatedly in the cathode compartment is disposed so as to contact both of an anion-exchange membrane and a cathode forming the cathode compartment.

16. The electrical deionization apparatus according to above item 13, wherein in the cathode compartment, an anion-exchange fibrous material is disposed along the surface of an anion-exchange membrane and/or a cathode forming the cathode compartment.

17. An electrical deionization apparatus having deionization compartments, concentration compartments and electrode compartments partitioned from one another by a plurality of ion-exchange membranes between a cathode and an anode, wherein in at least one compartment out of the deionization compartments, the concentration compartments and the electrode compartments, water-permeable porous material layers that have been given an ion-exchange function are disposed laminatedly intersecting the direction of flow of passing water.

18. The electrical deionization apparatus according to above item 17, wherein the water-permeable porous material that has been given an ion-exchange function is a material obtained by introducing ion-exchange groups into a substrate using radiation-induced graft polymerization.

19. The electrical deionization apparatus according to above item 17 or 18, wherein the water-permeable porous material that has been given an ion-exchange function is disposed in at least some of the deionization compartments.

20. The electrical deionization apparatus according to above item 17 or 18, wherein the water-permeable porous material that has been given an ion-exchange function is disposed in at least some of the concentration compartments.

21. The electrical deionization apparatus according to any of above items 17 through 20, wherein the water-permeable porous material that has been given an ion-exchange function is disposed in at least some of the electrode compartments.

22. The electrical deionization apparatus according to above item 17 or 18, wherein the water-permeable porous material that has been given an ion-exchange function is disposed in at least some of the deionization compartments and at least some of the concentration compartments.

23. The electrical deionization apparatus according to above item 22, wherein the water-permeable porous material that has been given an ion-exchange function is disposed in at least some of the electrode compartments.

24. The electrical deionization apparatus according to above item 21 or 23, wherein a water-permeable porous material that has been given a cation-exchange function is disposed in a cathode compartment.

25. An electrical deionization apparatus having deionization compartments, concentration compartments and electrode compartments partitioned from one another by a plurality of ion-exchange membranes between a cathode and an anode, wherein in at least one compartment out of the deionization compartments, the concentration compartments and the electrode compartments, a pleated ion exchange fibrous material structure formed by putting a long sheet-shaped anion-exchange fibrous material and a long sheet-shaped cation-exchange fibrous material laminatedly and folding the resulting structure in accordance with the width of the compartment is packed into the compartment such that surfaces of the pleats intersect a water-passing direction, and moreover the both end sections of the structure contact respectively a cation-exchange membrane and an anion-exchange membrane forming the compartment.

26. An electrical deionization apparatus having deionization compartments, concentration compartments and electrode compartments partitioned from one another by a plurality of ion-exchange membranes between a cathode and an anode, wherein in at least one compartment out of the deionization compartments, the concentration compartments and the electrode compartments, a rolled structure formed by putting a long sheet-shaped anion-exchange fibrous material and a long sheet-shaped cation-exchange fibrous material laminatedly and rolling up the resulting structure is packed into the compartment such that the both end sections of the structure contact respectively a cation-exchange membrane and an anion-exchange membrane forming the compartment.

Following is a more detailed description of the present invention through specific working examples. The following description merely gives specific examples of the present invention, and the present invention is not limited thereto.

Manufacturing Example 1

Manufacture of Cation-Exchange Nonwoven Fabric

A nonwoven fabric by thermal fusion bonding of areal density 55 g/m² and thickness 0.35 mm made of polyethylene (sheath)/polypropylene (core) composite fibers of fiber diameter 17 μm was used as a substrate. The nonwoven fabric substrate was irradiated with an electron beam (150 kGy) under a nitrogen atmosphere. After the irradiation, the nonwoven fabric substrate was immersed in a methanol solution of 10% glycidyl methacrylate for 4 hours at 45° C. After this, the nonwoven fabric substrate was immersed for 5 hours in a dimethylformamide solution at 60° C., thus removing the monomer of polymer (homopolymer) not bound to the substrate, whereby a nonwoven fabric material graft-polymerized with glycidyl methacrylate (graft rate 131%) was obtained. This grafted nonwoven fabric was immersed in a solution of sodium sulfite, isopropyl alcohol and water in a weight ratio of 1:1:8 for 10 hours at 80° C., thus introducing sulfonic acid groups, and then regeneration treatment was carried out with hydrochloric acid (5 wt %), thus obtaining a strongly acidic cation-exchange nonwoven fabric (salt dissociation capacity 471 meq/m²). This was used as a cation-exchange nonwoven fabric.

Manufacturing Example 2

Manufacture of Anion-Exchange Nonwoven Fabric

A nonwoven fabric substrate as in Manufacturing Example 1 was irradiated with an electron beam (150 kGy) under a nitrogen atmosphere. Chloromethylstyrene (made by Seimi Chemical Co., Ltd., trade name CMS-AM) was passed through an activated alumina packed layer to remove a polymerization inhibitor, and was then aerated with nitrogen gas. The nonwoven fabric substrate that had been irradiated with the electron beam was then immersed in the deoxygenated chloromethylstyrene solution for 6 hours at 50° C. After that, the nonwoven fabric was taken out from the chloromethylstyrene solution, and was immersed for 3 hours in toluene, thus removing homopolymer, whereby a nonwoven fabric material graft-polymerized with chloromethylstyrene (graft rate 161%) was obtained. This grafted nonwoven fabric was treated in a trimethylamine solution (10 wt %) so as to attach quaternary ammonium groups thereto, and was then subjected to regeneration treatment with a sodium hydroxide aqueous solution (5 wt %), thus obtaining a strongly basic anion-exchange nonwoven fabric having quaternary ammonium groups (salt dissociation capacity 350 meq/m²). This was used as an 'anion-exchange nonwoven fabric'.

Manufacturing Example 3

Manufacture of Cation-Conducting Spacer

A polyethylene oblique net of thickness 1.2 mm and pitch 3 mm was used as a ion-conducting spacer substrate, and sodium styrenesulfonate was used as a graft monomer and acrylic acid as a supplementary monomer.

While cooling with dry ice, the polyethylene oblique net was irradiated with γ rays (150 kGy) in a nitrogen atmosphere. After the irradiation, the oblique net was immersed in a mixed monomer solution of sodium styrenesulfonate and acrylic acid for 3 hours at 75° C., thus obtaining a grafted oblique net material (cation-conducting spacer) having sulfonic acid groups and carboxyl groups (graft rate 153%). The salt dissociation capacity was 189 meq/m², and the overall exchange capacity was 834 meg/m². This was used as a 'cation-conducting spacer'.

Manufacturing Example 4

Manufacture of Anion-Conducting Spacer

While cooling with dry ice, a polyethylene oblique net as in Manufacturing Example 3 was irradiated with γ rays (150 kGy) in a nitrogen atmosphere. After the irradiation, the oblique net was immersed in a monomer mixture of VBTAC (vinylbenzyl trimethyl ammonium chloride) and DMAA (dimethylacrylamide), for 3 hours at 50° C., thus obtaining an oblique net grafted with VBTAC and DMAA. The graft rate was calculated to be 156%. The grafted oblique net obtained was calculated to have a salt dissociation capacity of 198 meq/m². This was used as an 'anion-conducting spacer'.

Working Example 1

Figure 6:
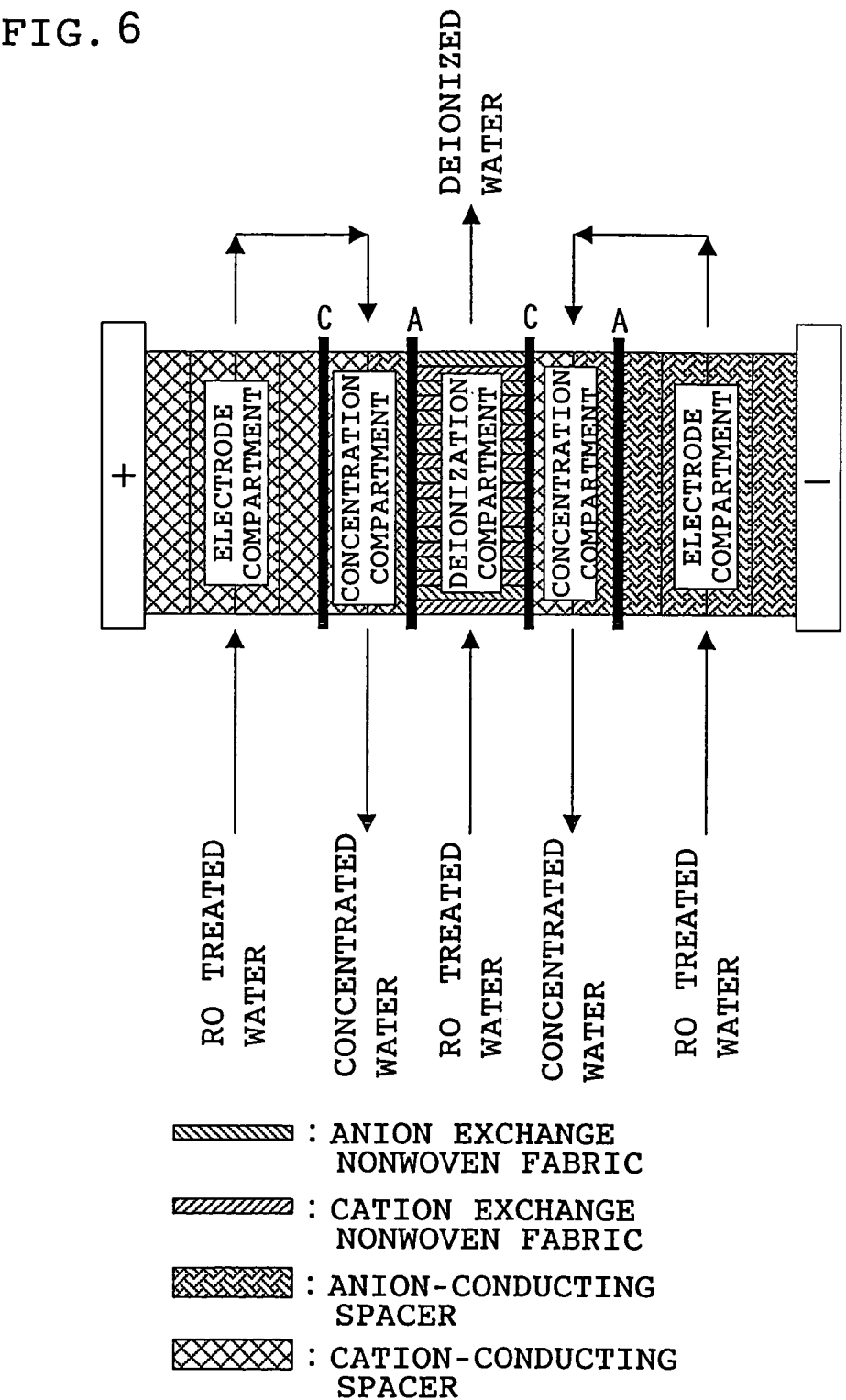
FIG. 6 is a conceptual drawing showing the constitution of an electrical deionization apparatus of the present invention used in Working Example 1.

An electrical deionization apparatus having the constitution shown in FIG. 6 was assembled. Cation-exchange membranes C (made by Tokuyama Corporation: Neosepta CMB) and anion-exchange membranes A (made by Tokuyama Corporation: Neosepta AHA) were arranged between a cathode and an anode as shown in FIG. 6, thus being composed of an electrical deionization apparatus having an anode compartment, a concentration compartment, a deionization compartment, a concentration compartment, and a cathode compartment arranged therein in this order from the anode side. The width of the deionization compartment was 20 mm, the size of the electrodes 50 mm long×50 mm wide, and the width of the concentration compartments and electrode compartments was 3 mm. In the deionization compartment, twenty-five of each of a cation-exchange nonwoven fabric manufactured in Manufacturing Example 1 and regenerated with hydrochloric acid, and an anion exchange nonwoven fabric manufactured in Manufacturing Example 2 and regenerated with an alkali were packed laminatedly and alternately in a direction intersecting the direction of flow of water to be treated (i.e. transversely) as shown in FIG. 6. In the concentration compartments, two of an anion-conducting spacer manufactured in Manufacturing Example 4 were disposed parallel to the anion-exchange membrane on the surface of the anion-exchange membrane, and two of a cation-conducting spacer manufactured in Manufacturing Example 3 were disposed parallel to the cation-exchange membrane on the surface of the cation-exchange membrane. Moreover, in the anode compartment, four of a cation-conducting spacer manufactured in Manufacturing Example 3 were disposed parallel to the cation-exchange membrane, and in the cathode compartment, four of an anion-conducting spacer manufactured in Manufacturing Example 4 were disposed parallel to the anion-exchange membrane.

Figure 7:
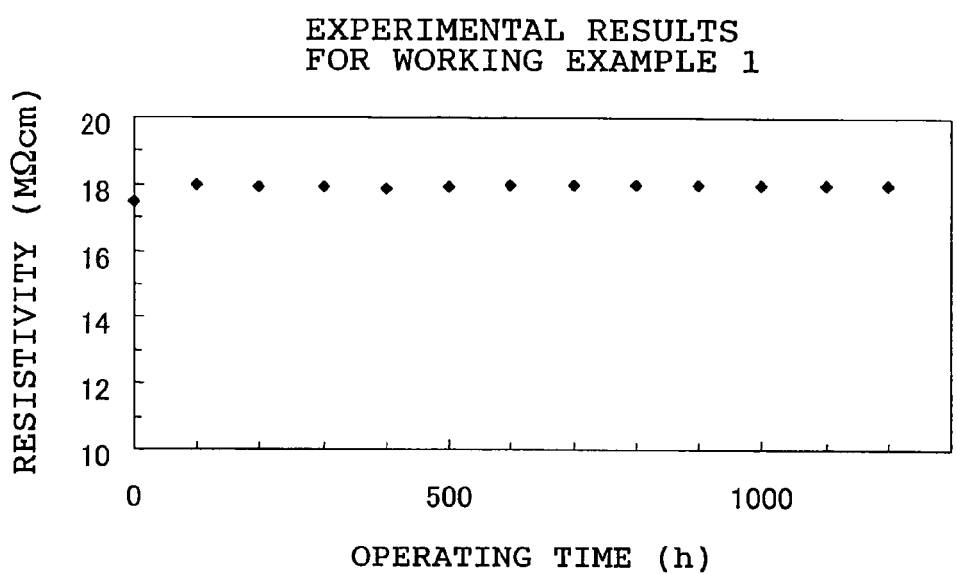
FIG. 7 is a graph showing water-passing experiment results for Working Example 1.

A direct current of 0.4 A was applied between the electrodes, 0.2 MΩcm RO treated water (reverse osmosis membrane-treated water: silica concentration 0.1 to 0.3 ppm, temperature 14 to 26° C., TOC concentration 120 ppb) was passed into the deionization compartment at a flowrate of 10 Lh$^{-1}$ (SV=200 h$^{-1}$), and regarding the concentration compartments and the electrode compartments, 0.2 MΩcm RO treated water was passed at 2.5 Lh$^{-1}$ in series from the electrode compartment on the cathode side into the concentration compartment on the cathode side, and in series from the electrode compartment on the anode side into the concentration compartment on the anode side. As a result, after 1 minute's operation, 18.2 MΩcm deionized water was obtained from the deionization compartment, and after 1000 hours' operation, water of resistivity at least 18.0 MΩcm was obtained stably. FIG. 7 shows a graph of the specific resistance of the treated water up to 1200 hours' operation. Moreover, the TOC concentration of the treated water was 7.2 ppb after 25 hours' operation, and reached to an equilibrium value of 5.3 ppb. The pressure loss in the deionization compartment was 0.5 kgf/cm² after 1000 hours' operation.

Comparative Example 1

A loading test was carried out with a conventional electrical deionization apparatus in which ion-exchange fibrous materials and ion-conducting spacers were packed into the deionization compartments and concentration compartments parallel to the direction of flow of water to be treated. As shown in FIG. 8, anion-exchange membranes (A) and cation-exchange membranes (C) were arranged alternately between electrodes, thus assembling an electrical deionization apparatus of a heretofore known type having three deionization compartments. The width of each deionization compartment cell and each electrode compartment was 2.5 mm, the width of each concentration compartment 1.5 mm, and the size of the electrodes was 240 mm long×50 mm wide. The ion-exchange membranes manufactured in Working Example 1 were used. In each deionization compartment, one anion-exchange nonwoven fabric manufactured in Manufacturing Example 2 was disposed on the surface of the anion-exchange membrane, and one cation-exchange nonwoven fabric manufactured as in Manufacturing Example 1 was disposed on the surface of the cation-exchange membrane, and two of an anion-conducting spacer manufactured in Manufacturing Example 4 were packed in between the nonwoven fabrics. In each concentration compartment, one anion-conducting spacer manufactured in Manufacturing Example 4 was packed on the surface of the anion-exchange membrane, and one cation-conducting spacer manufactured in Manufacturing Example 3 was packed on the surface of the cation-exchange membrane. Moreover, in the anode compartment, four of a cation-conducting spacer manufactured in Manufacturing Example 3 were disposed, and in the cathode compartment, four of an anion-conducting spacer manufactured in Manufacturing Example 4 were disposed.

A direct current of 0.13 A was applied between the electrodes, 0.2 MΩcm RO treated water (reverse osmosis membrane-treated water: silica concentration 0.1 to 0.3 ppm, temperature 14 to 26° C., TOC concentration 120 ppb) was passed in series into the deionization compartments D1, D2 and D3 at a flowrate of 5 Lh$^{-1}$ (SV=55.6 h$^{-1}$), and regarding the concentration compartments and the electrode compartments, 0.2 MΩcm RO treated water was passed at 2.5 Lh$^{-1}$ in series from the electrode compartment on the cathode side (K2) through the concentration compartments C2 and C1 and into the electrode compartment on the anode side (K1). As a result, after 100 hours, 17.9 MΩcm water was obtained as deionized water, and after 1000 hours' operation, 17.6 MΩcm water was obtained. Moreover, the TOC concentration of the treated water was 10 ppb after 200 hours' operation, and reached to an approximate equilibrium value at 9.2 ppb. After 1000 hours' operation, the pressure loss in the three deionization compartments was 0.5 kgf/cm².

A similar experiment was carried out with the same apparatus but with the flowrate into the deionization compartments increased to 20 Lh$^{-1}$ (SV=222 h$^{-1}$) and the flowrate into the concentration compartments increased to 10 Lh$^{-1}$, whereupon the water quality did increase as the operating time passed, but after 1000 hours' operation bottomed out at a water quality of 1.3 MΩcm. After 1000 hours' operation, the pressure loss in the three deionization compartments was 2.3 kgf/cm².

Comparative Example 2

Figure 9:
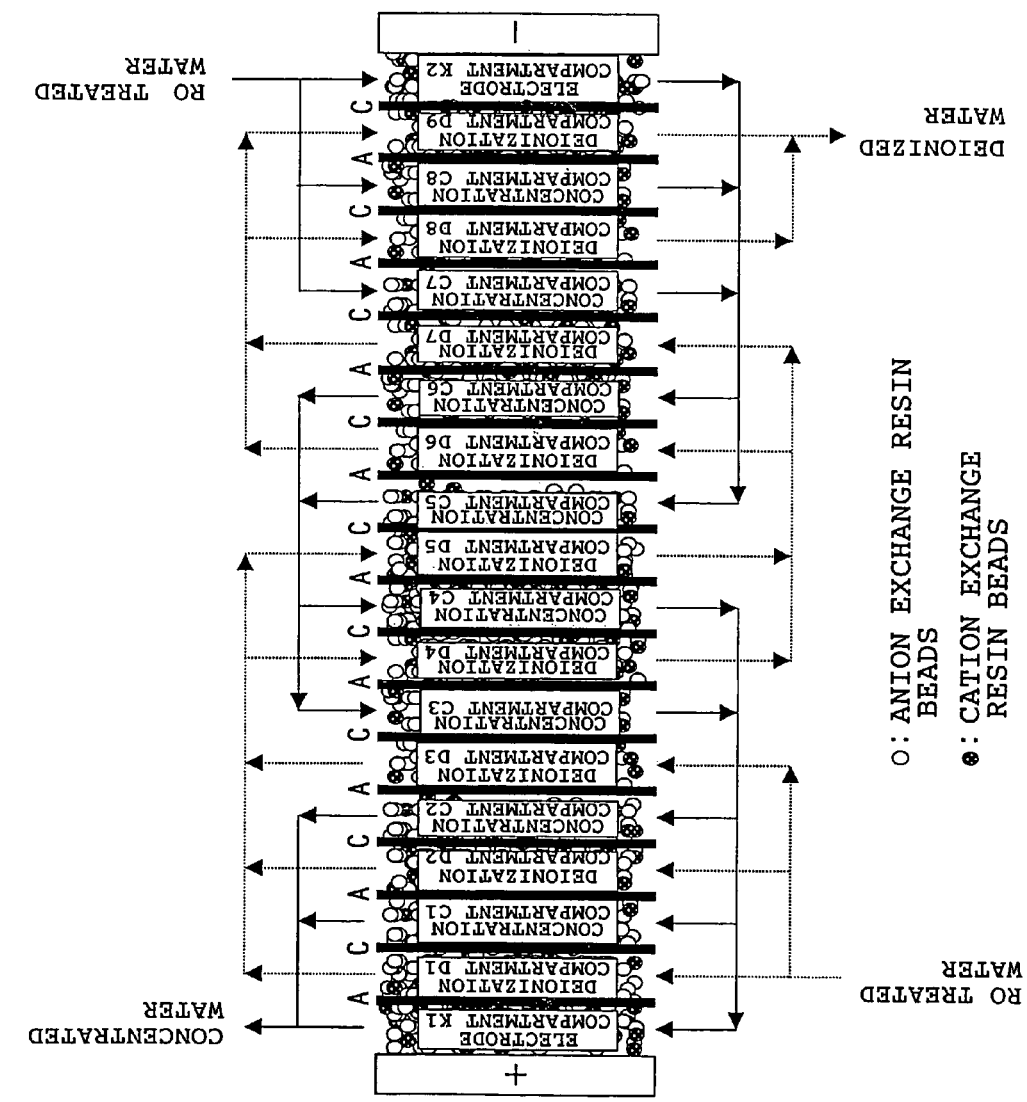
FIG. 9 is a conceptual drawing showing the constitution of an electrical deionization apparatus according to prior art used in Comparative Example 2.

A loading test was carried out with a conventional electrical deionization apparatus having ion-exchange resin beads packed into the deionization compartments and concentration compartments. As shown in FIG. 9, an electrical deionization apparatus of a heretofore known type having nine deionization compartments was assembled. The width of each deionization compartment cell was 3 mm, the width of each concentration compartment and electrode compartment was 3 mm, and the size of the electrodes was 220 mm long×35 mm wide. The ion-exchange membranes manufactured in Working Example 1 were used, and in each deionization compartment, each concentration compartment and each electrode compartment, cation-exchange resin beads (Dowex Monosphere 650C made by Dow Chemical Company) and an anion-exchange resin beads (Dowex Monosphere 550A made by Dow Chemical Company) were mixed and packed. A direct current of 0.1 A was applied between the electrodes, 0.2 MΩcm RO treated water (reverse osmosis membrane-treated water: silica concentration 0.1 to 0.3 ppm, temperature 14 to 26° C., TOC concentration 120 ppb) was passed into the deionization compartments as shown in FIG. 9 at a flowrate of 12 $Lh^{-1}$ (SV=57.7 $h^{-1}$), and regarding the concentration compartments and the electrode compartments, 0.2 MΩcm RO treated water was passed at 6 $Lh^{-1}$ from the electrode compartment on the cathode side (K2) through the concentration compartments as shown in FIG. 9 and into the electrode compartment on the anode side (K1). As a result, after 1000 hours' operation, a water quality of 4.3 MΩcm was obtained, and the TOC concentration of the treated water was 20 ppb after 1000 hours. After 1000 hours' operation, the pressure loss in the deionization compartments was 0.8 kgf/cm².

A similar experiment was carried out with the same apparatus but with the flowrate into the deionization compartments increased to 36 $Lh^{-1}$ (SV=173 $h^{-1}$) and the flowrate into the concentration compartments increased to 18 $Lh^{-1}$, whereupon the water quality did increase as the operating time passed, but after 1000 hours' operation bottomed out a water quality of 0.5 MΩcm. The TOC concentration of the treated water after 1000 hours' operation was 15 ppb, and the pressure loss in the deionization compartments was 2.5 kgf/cm².

As is clear from Working Example 1 and Comparative Examples 1 and 2 described above, according to the electrical deionization apparatus of the present invention, a good quality of treated water could be obtained at a much higher water flowrate than with the conventional electrical deionization apparatuses. Moreover, the apparatus was downsized, and hence the pressure loss in the deionization compartments did not cause a problem.

Working Example 2

Figure 10:
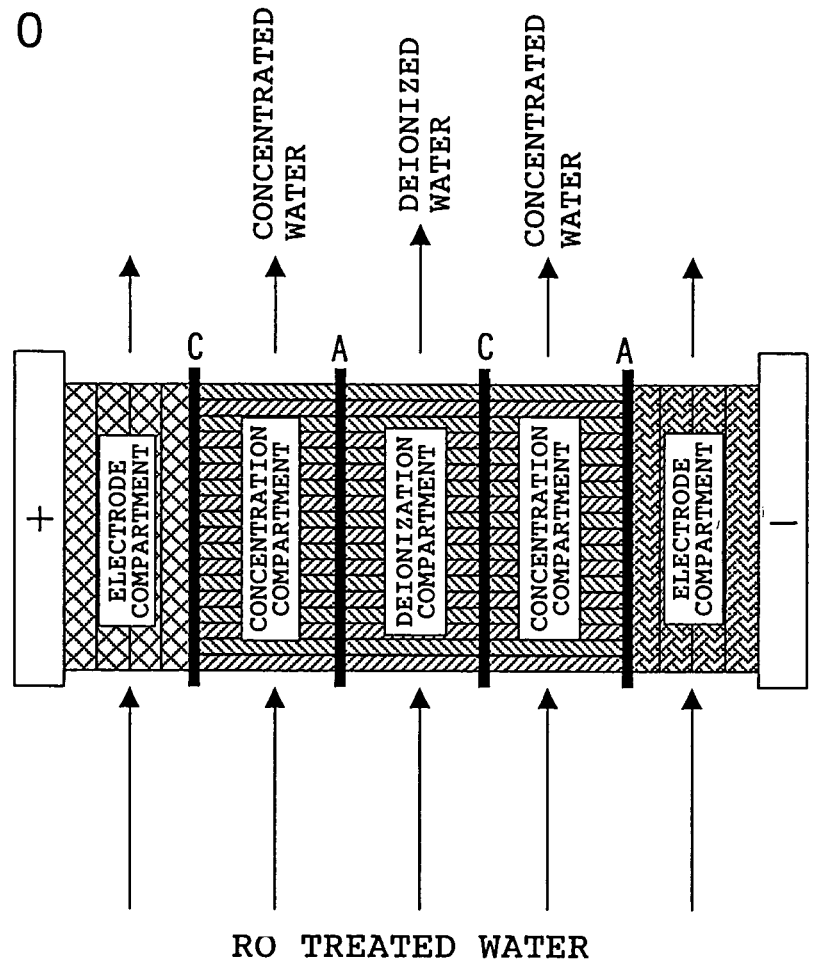
FIG. 10 is a conceptual drawing showing the constitution of an electrical deionization apparatus according to a second embodiment of the present invention used in Working Example 2.

An electrical deionization apparatus having the constitution shown in FIG. 10 was assembled. Cation-exchange membranes C (made by Tokuyama Corporation: Neosepta CMB) and anion-exchange membranes A (made by Tokuyama Corporation: Neosepta AHA) were arranged between a cathode and an anode as shown in FIG. 10, thus forming an electrical deionization apparatus having an anode compartment, a concentration compartment, a deionization compartment, a concentration compartment, and a cathode compartment arranged therein in this order from the anode side. The width of the deionization compartment and the concentration compartments was 20 mm, the size of the electrodes was 50 mm long×50 mm wide, and the width of the electrode compartments was 3 mm. In the deionization compartment and the concentration compartments, twenty-five of a cation-exchange nonwoven fabric were manufactured in Manufacturing Example 1 and regenerated with hydrochloric acid, and an anion-exchange nonwoven fabric manufactured as in Manufacturing Example 2 and regenerated with an alkali were packed laminatedly and alternately in a direction intersecting the direction of flow of water to be treated (i.e. crossways) as shown in FIG. 10. Moreover, in the anode compartment, four of a cation-conducting spacer manufactured in Manufacturing Example 3 were disposed parallel to the cation-exchange membrane, and in the cathode compartment, four of an anion-conducting spacer manufactured in Manufacturing Example 4 were disposed parallel to the anion-exchange membrane.

Figure 12:
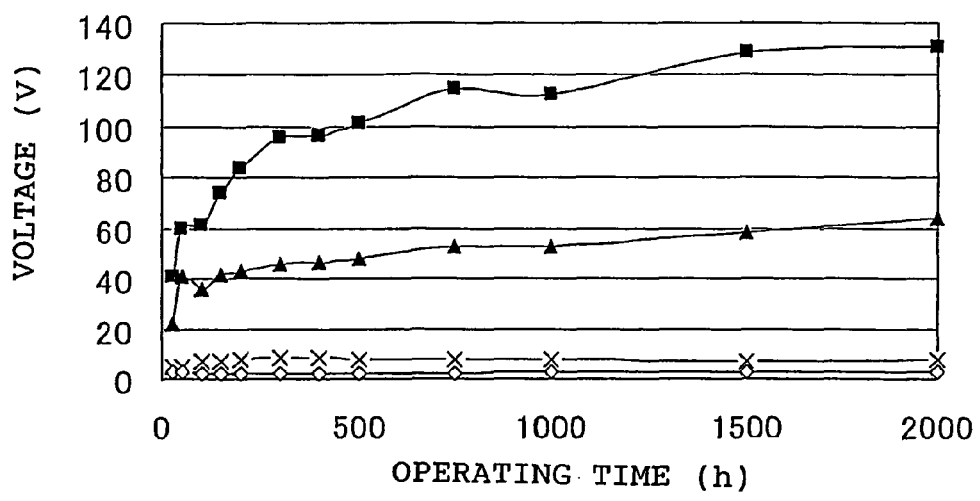
FIG. 12 is a graph showing operation experiment results for Working Example 2.

A direct current of 0.4 A was applied between the electrodes, 0.2 MΩcm RO treated water (reverse osmosis membrane-treated water: silica concentration 0.1 to 0.3 ppm, temperature 14 to 26° C., TOC concentration 120 ppb, carbonate concentration 6.5 ppm, calcium concentration 208 ppb) was passed into the deionization compartment at a flowrate of 20 $Lh^{-1}$ (SV=400 $h^{-1}$), 0.2 MΩcm RO treated water was passed into each concentration compartment at 12 $Lh^{-1}$, and 0.2 MΩcm RO treated water was passed into each electrode compartment at 8 $Lh^{-1}$. As a result, after 1 minute's operation, 18.2 MΩcm water was obtained from the deionization compartment as deionized water. The operating voltage after 30 hours' operation was 40.75 V. Moreover, the voltages across the both ends of the concentration compartment on the cathode side and the anode compartment at this time were 4.87 V and 2.71 V respectively. Continuous operation was then carried out for 2000 hours, and the operating voltage and the voltage across the both ends of each of the concentration compartments and the deionization compartment with operating time were measured. The results are shown in FIG. 12. The operating voltage and the voltage across the both ends of each of the concentration compartments increased gradually after startup of operation, but after approximately 200 hours the voltage across the both ends of each of the concentration compartments became approximately constant, and moreover the increasing rate of the operating voltage became very low after approximately 500 hours' operation. After 2000 hours' operation, the operating voltage was 130 V, and the voltage across the both ends of the concentration compartment on the cathode side was 8.0 V. After operation, the apparatus was disassembled and the ion-exchange nonwoven fabrics in the concentration compartments were inspected, but deposition of scale was not observed in particular.

Note that regarding the deionization apparatus of the constitution shown in FIG. 10, the voltage across the both ends of each of the concentration compartments was measured by laying platinum electrode wires (diameter 0.4 mm) on the cation-exchange membrane side in the anode compartment, on the anion-exchange membrane side in the concentration compartment on the anode side, on the cation-exchange membrane side in the concentration compartment on the cathode side, and on the anion-exchange membrane side in the cathode compartment, and measuring the potential differences between the electrodes.

Comparative Example 3

Figure 11:
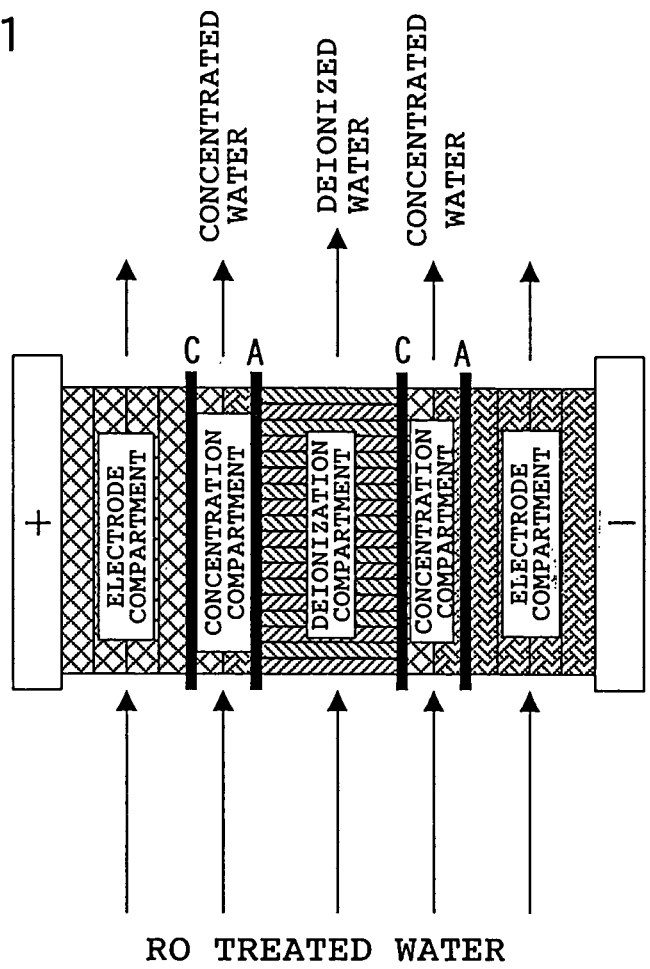
FIG. 11 is a conceptual drawing showing the constitution of an electrical deionization apparatus used in Comparative Example 3.

An electrical deionization apparatus having the constitution shown in FIG. 11 was assembled. Cation-exchange membranes C (made by Tokuyama Corporation: Neosepta CMB) and anion-exchange membranes A (made by Tokuyama Corporation: Neosepta AHA) were arranged between a cathode and an anode as shown in FIG. 11, thus forming an electrical deionization apparatus having an anode compartment, a concentration compartment, a deionization compartment, a concentration compartment, and a cathode compartment arranged therein in this order from the anode side. The width of the deionization compartment was 20 mm, the size of the electrodes was 50 mm long×50 mm wide, and the width of the concentration compartments and electrode compartments was 3 mm. In the deionization compartment, twenty-five of a cation-exchange nonwoven fabric manufactured in Manufacturing Example 1 and regenerated with hydrochloric acid, and an anion-exchange nonwoven fabric manufactured in Manufacturing Example 2 and regenerated with an alkali were packed laminatedly and alternately in a direction intersecting the direction of flow of water to be treated (i.e. crossways) as shown in FIG. 11. In each of the concentration compartments, one of an anion-conducting spacer manufactured in Manufacturing Example 4 was disposed parallel to the anion-exchange membrane on the anion-exchange membrane, and one of a cation-conducting spacer manufactured in Manufacturing Example 3 was disposed parallel to the cation-exchange membrane on the surface of the cation-exchange membrane. Moreover, in the anode compartment, four of a cation-conducting spacer manufactured in Manufacturing Example 3 were disposed parallel to the cation-exchange membrane, and in the cathode compartment, four of an anion-conducting spacer manufactured in Manufacturing Example 4 were disposed parallel to the anion-exchange membrane.

Figure 13:
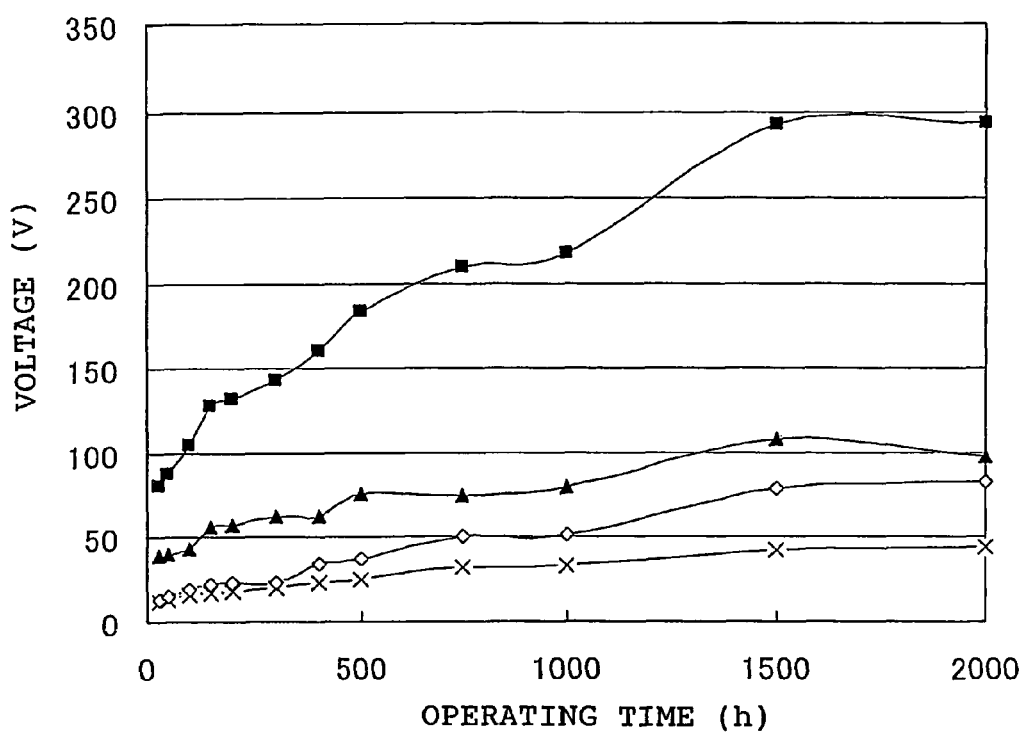
FIG. 13 is a graph showing operation experiment results for Comparative Example 3.

A direct current of 0.4 A was applied between the electrodes, 0.2 MΩcm RO treated water (reverse osmosis membrane-treated water: silica concentration 0.1 to 0.3 ppm, temperature 14 to 26° C., TOC concentration 120 ppb, carbonate concentration 6.5 ppm, calcium concentration 208 ppb) was passed into the deionization compartment at a flowrate of 20 $Lh^{-1}$ ($SV=400\ h^{-1}$), 0.2 MΩcm RO treated water was passed into each concentration compartment at 12 $Lh^{-1}$, and 0.2 MΩcm RO treated water was passed into each electrode compartment at 8 $Lh^{-1}$. As a result, after 1 minute's operation, 18.2 MΩcm water was obtained from the deionization compartment as deionized water. The operating voltage after 30 hours' operation was 81.2 V. Moreover, the voltages across the both ends of the concentration compartment on the cathode side and the concentration compartment on the anode side at this time were 11.9 V and 13.1 V respectively. Continuous operation was then carried out for 2000 hours, and the operating voltage and the voltage across the both ends of each of the concentration compartments and the deionization compartment with operating time were measured. The results are shown in FIG. 13. Comparing with the results for Working Example 2 shown in FIG. 12, the degree of increase in the operating voltage and the voltage across the both ends of each of the concentration compartments is very large, and these voltages further increase even after 1000 hours' operation. After 2000 hours' operation, the operating voltage was 293.9 V, the voltage across the both ends of the concentration compartment on the cathode side was 44.0 V, and the voltage across the both ends of the concentration compartment on the anode side was 82.7 V.

After 2000 hours' operation, the apparatus was disassembled and the ion-conducting spacers in the concentration compartments were inspected, whereupon it was found that calcium carbonate scale was deposited severely on the whole of the spacers. It is thought that calcium carbonate crystals were first deposited at the part of contact between the anion-conducting spacer and the cation-conducting spacer, and then with these as nuclei crystals, crystals were deposited on the whole of the spacers.

Comparing Working Example 2 and Comparative Example 3, it can be seen that the stability of the operating voltage was better for Working Example 2 in which even in the concentration compartments, anion-exchange nonwoven fabrics and cation-exchange nonwoven fabrics were packed laminatedly and transversely in a direction intersecting the direction of flow. From the inspection after disassembling the apparatus after operation for a long time, it is thought that this stability of the operating voltage is due mainly to resistant to deposition of calcium carbonate scale in the concentration compartments.

Working Example 3

Figure 14:
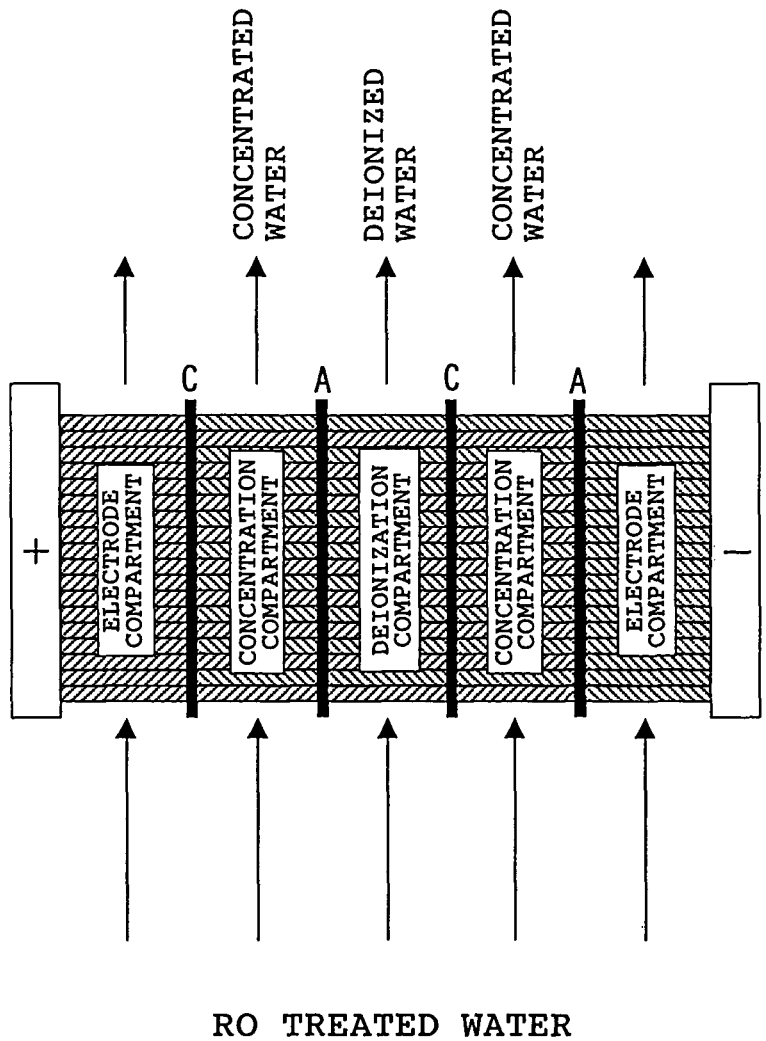
FIG. 14 is a conceptual drawing showing the constitution of an electrical deionization apparatus according to a third embodiment of the present invention used in Working Example 3.

An electrical deionization apparatus having the constitution shown in FIG. 14 was assembled. Cation-exchange membranes C (made by Tokuyama Corporation: Neosepta CMB) and anion-exchange membranes A (made by Tokuyama Corporation: Neosepta AHA) were arranged between a cathode and an anode as shown in FIG. 14, thus forming an electrical deionization apparatus having an anode compartment, a concentration compartment, a deionization compartment, a concentration compartment, and a cathode compartment arranged therein in this order from the anode side. The width of the deionization compartment and the concentration compartments was 20 mm, the size of the electrodes was 50 mm long×50 mm wide, and the width of the electrode compartments was 5 mm. In the deionization compartment and the concentration compartments, twenty-five of each of a cation-exchange nonwoven fabric manufactured in Manufacturing Example 1 and regenerated with hydrochloric acid, and an anion-exchange nonwoven fabric manufactured in Manufacturing Example 2 and regenerated with an alkali were packed laminatedly and alternately in a direction intersecting the direction of flow of water to be treated (i.e. transversely) as shown in FIG. 14. In the anode compartment, fifty of a cation-exchange nonwoven fabric manufactured in Manufacturing Example 1 were packed laminatedly in a direction intersecting the water-passing direction (i.e. transversely) as shown in FIG. 14. In the cathode compartment, fifty of an anion-exchange nonwoven fabric manufactured in Manufacturing Example 2 were packed laminatedly in a direction intersecting the water-passing direction (i.e. transversely) as shown in FIG. 14.

Figure 16:
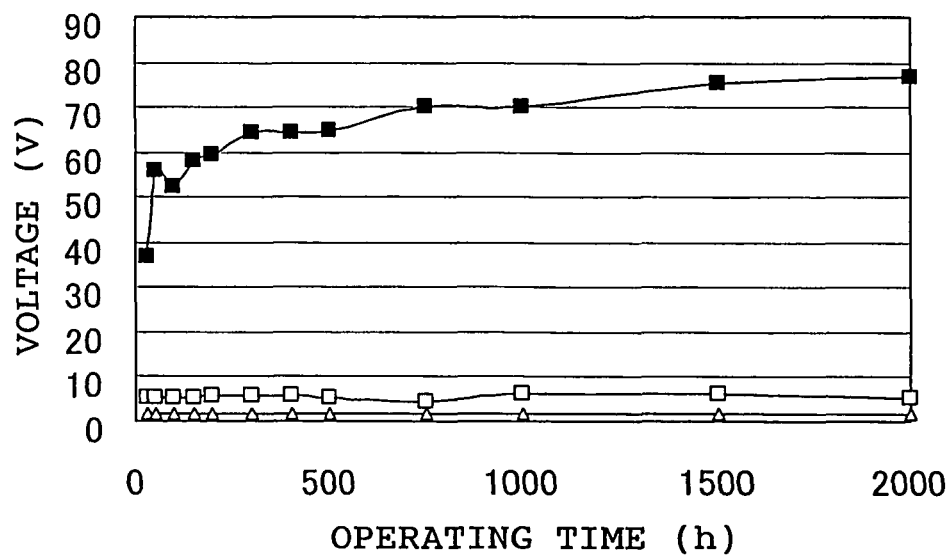
FIG. 16 is a graph showing operation experiment results for Working Example 3.

A direct current of 0.4 A was applied between the electrodes, 0.2 MΩcm RO treated water (reverse osmosis membrane-treated water: silica concentration 0.1 to 0.3 ppm, temperature 14 to 26° C., TOC concentration 120 ppb, carbonate concentration 6.5 ppm, calcium concentration 208 ppb) was passed into the deionization compartment at a flowrate of 20 $Lh^{-1}$ ($SV=400\ h^{-1}$), 0.2 MΩcm RO treated water was passed into each concentration compartment at 12 $Lh^{-1}$, and 0.2 MΩcm RO treated water was passed into each electrode compartment at 8 $Lh^{-1}$. As a result, after 1 minute's operation, 18.2 MΩcm water was obtained from the deionization compartment as deionized water. The operating voltage after 30 hours' operation was 36.6 V. Moreover, the voltages across the both ends of the cathode compartment and the anode compartment at this time were 5.25 V and 2.71 V respectively. Continuous operation was then carried out for 2000 hours' operation, and the operating voltage and the voltage across the both ends of each of the electrode compartments with operating time were measured. The results are shown in FIG. 16. The voltage across the both ends of each of the electrode compartments exhibited a stable low value from the startup of operation, and after 2000 hours' operation, the operating voltage was 76.6 V, and the voltages across the both ends of the cathode compartment and the anode compartment were 5.33 V and 1.65 V respectively. On the other hand, the voltage across the both ends of each of the electrode compartments with time during the operation of the electrical deionization apparatus of Working Example 2 are shown in FIG. 17.

Figure 17:
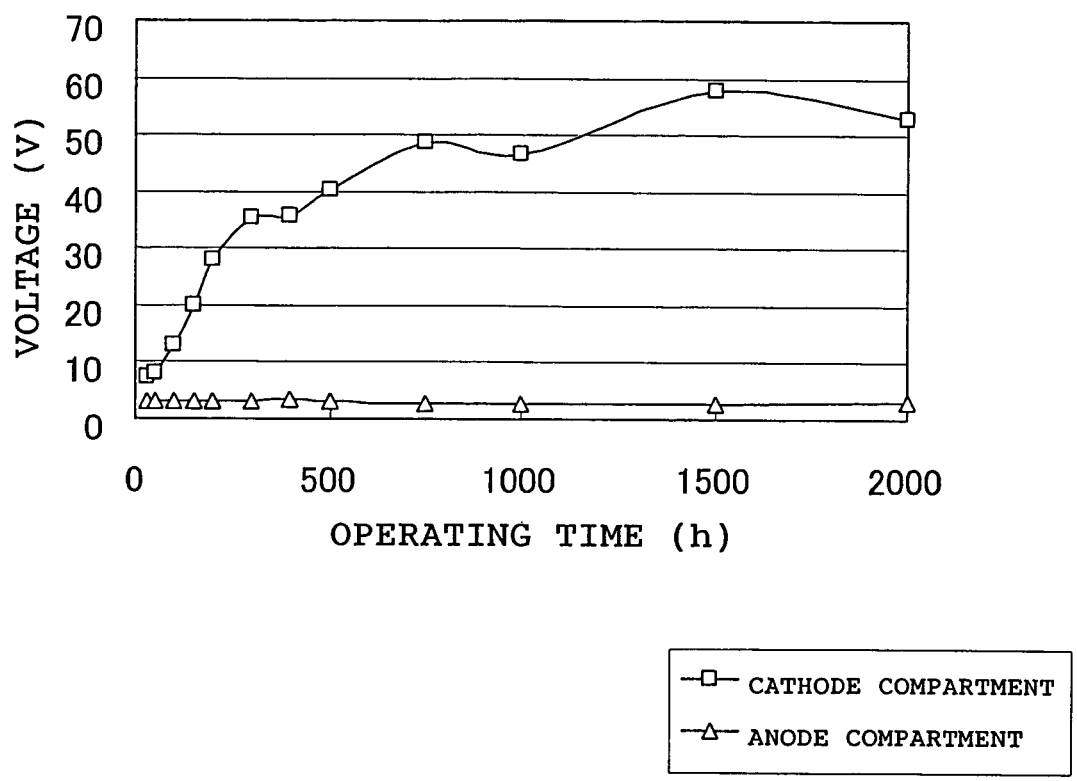
FIG. 17 is a graph showing changes over time in the voltage across the two ends of each of the electrode compartments during the operation experiment for Working Example 2.

Comparing with the results of Working Example 2 shown in FIG. 17, it can be seen that Working Example 3 in which anion-exchange nonwoven fabrics were disposed laminatedly and transversely in the cathode compartment, the increase in the voltage across the both ends of the cathode compartment was greatly suppressed.

Working Example 4

Figure 15:
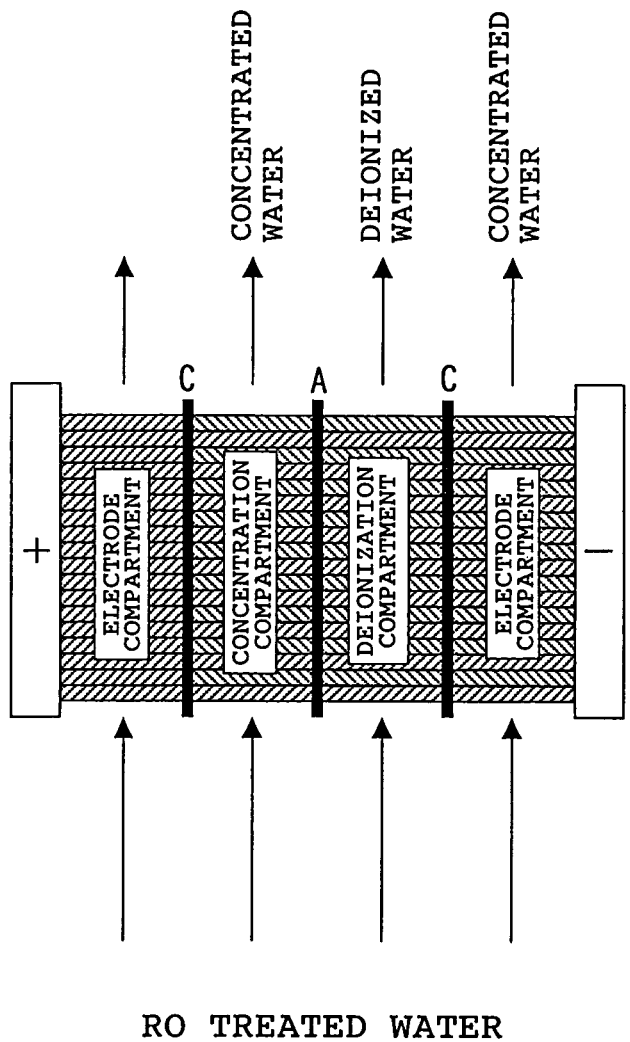
FIG. 15 is a conceptual drawing showing the constitution of an electrical deionization apparatus according to the third embodiment of the present invention used in Working Example 4.

An electrical deionization apparatus having the constitution shown in FIG. 15 was assembled. Cation-exchange membranes C (made by Tokuyama Corporation: Neosepta CMB) and an anion-exchange membrane A (made by Tokuyama Corporation: Neosepta AHA) were arranged between a cathode and an anode as shown in FIG. 15, thus forming an electrical deionization apparatus having an anode compartment, a concentration compartment, a deionization compartment, and a concentration compartment (-cum-cathode compartment) arranged therein in this order from the anode side. The width of the deionization compartment, the concentration compartment and the concentration compartment-cum-cathode compartment was 20 mm, the size of the electrodes was 50 mm long×50 mm wide, and the width of the anode compartment was 5 mm. In the deionization compartment, the concentration compartment and the concentration compartment-cum-cathode compartment, twenty-five of each of a cation-exchange nonwoven fabric manufactured in Manufacturing Example 1 and regenerated with hydrochloric acid, and an anion-exchange nonwoven fabric manufactured in Manufacturing Example 2 and regenerated with an alkali were packed laminatedly and alternately in a direction intersecting the direction of flow of water to be treated (i.e. transversely) as shown in FIG. 15. In the anode compartment, fifty of cation-exchange nonwoven fabric manufactured in Manufacturing Example 1 were packed laminatedly in a direction intersecting the water-passing direction (i.e. transversely) as shown in FIG. 15.

Figure 18:
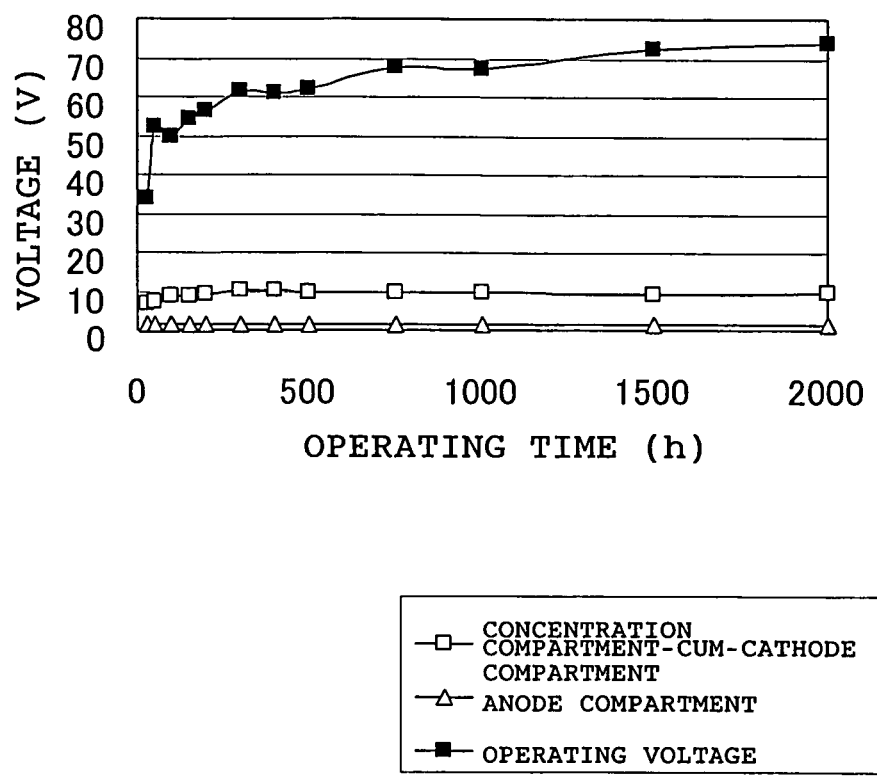
FIG. 18 is a graph showing operation experiment results for Working Example 4.

A direct current of 0.4 A was applied between the electrodes, 0.2 MΩcm RO treated water (reverse osmosis membrane-treated water: silica concentration 0.1 to 0.3 ppm, temperature 14 to 26° C., TOC concentration 120 ppb, carbonate concentration 6.5 ppm, calcium concentration 208 ppb) was passed into the deionization compartment at a flowrate of 20 Lh$^{-1}$ (SV=400 h$^{-1}$), 0.2 MΩcm RO treated water was passed into the concentration compartment at 12 Lh$^{-1}$, and 0.2 MΩcm RO treated water was passed into each of the anode compartment and the concentration compartment-cum-cathode compartment at 8 Lh$^{-1}$. As a result, after 1 minute's operation, 18.2 MΩcm water was obtained from the deionization compartment as deionized water. The operating voltage after 30 hours' operation was 33.4 V. Moreover, the voltages across the both ends of the concentration compartment-cum-cathode compartment and the anode compartment at this time were 6.71 V and 1.71 V respectively. Continuous operation was then carried out for 2000 hours' operation, and the operating voltage and the voltage across the both ends of each of the anode compartment and the concentration compartment-cum-cathode compartment with operating time were measured. The results are shown in FIG. 18. The voltage across the both ends of each of the anode compartment and the concentration compartment-cum-cathode compartment exhibited a stable low value from the startup of operation, and after 2000 hours' operation, the operating voltage was 73.9 V, and the voltages across the both ends of the concentration compartment-cum-cathode compartment and the anode compartment were 9.84 V and 1.78 V respectively.

INDUSTRIAL APPLICABILITY

According to the present invention, a novel deionization compartment structure is adopted in which, in each of the deionization compartments, ion-exchange fibrous materials are packed laminatedly in direction intersecting the water-passing direction. Compared with a conventional electrical deionization apparatus, water of high purity (high specific resistance and low TOC) can be obtained stably using a smaller apparatus. Moreover, because the apparatus can be made small, the problem of pressure loss which occurs when only fibrous materials are packed into a deionization compartment is not very great. Furthermore, by adopting a similar structure of the deionization compartments to the concentration compartments and the electrode compartments as well, the problem of an increase in the operating voltage due to deposition of calcium carbonate can be suppressed.

The invention claimed is:

1. An electrical deionization apparatus comprising:
a cathode compartment comprising a cathode,
an anode compartment comprising an anode,
at least one deionization compartment,
at least two concentration compartments,
a first cation-exchange membrane positioned between the anode compartment and a first concentration compartment,
a first anion-exchange membrane positioned between the first concentration compartment and the at least one deionization compartment,
a second cation-exchange membrane positioned between the at least one deionization compartment and a second concentration compartment, and
a second anion-exchange membrane positioned between the second concentration compartment and the cathode compartment, wherein
each compartment has a water inlet and a water outlet at opposite sides of the each compartment such that water to be treated flows through the each compartment from the water inlet to the water outlet,
the water flowing into the at least two concentration compartments is RO (Reverse Osmosis Membrane) treated water and the RO treated water flows into one concentration compartment from the cathode compartment and into an other concentration compartment from the anode compartment, respectively,
the at least one deionization compartment comprises
at least two sheets of anion-exchange fibrous material, and
at least two sheets of cation-exchange fibrous material, wherein a sheet of cation-exchange fibrous material and a sheet of the anion-exchange fibrous material are alternately and tightly stacked in a manner that a longitudinal surface of the sheet is perpendicular to water flow through the at least one deionization compartment from the water inlet to the water outlet, and both ends of the sheets are in close contact with each of the first anion-exchange membrane and the second cation-exchange membrane thereby forming successfully arranged water dissociation fields between the sheet of anion-exchange fibrous material and the sheet of the cation-exchange fibrous material, as well as the contacted ends of the cation-exchange fibrous material, the anion-exchange fibrous material, the second cation-exchange membrane, and the first anion-exchange membrane, at least one of the at least two concentration compartments comprises
- at least one anion-conductive spacer located next to the first or the second anion-exchange membrane, and
- at least one cation-conductive spacer located next to the first or the second cation-exchange membrane,
- wherein the at least one anion-conductive spacer and the at least one cation-conductive spacer are positioned in a manner that a longitudinal surface of each spacer is parallel to water flow through the compartment from the water inlet to the water outlet, and the anion-exchange fibrous material, the cation-exchange fibrous material, the anion-conductive spacer, and the cation-conductive spacer are obtained by introducing ion-exchange groups onto a substrate using radiation-induced graft polymerization.

2. The electrical deionization apparatus of claim 1, wherein the deionization compartment further comprises an additional sheet of anion-exchange fibrous material positioned between the first anion-exchange membrane and the ends of the alternately and tightly stacked sheets of cation-exchange fibrous material and the anion-exchange fibrous material; and an additional sheet of cation-exchange fibrous material positioned between the second cation-exchange membrane and the ends of the alternately and tightly stacked sheets of cation-exchange fibrous material and the anion-exchange fibrous material.

3. The electrical deionization apparatus of claim 1, wherein the cathode compartment further comprises at least one anion-conductive spacer, and the anode compartment further comprise at least one cation-conductive spacer.

4. The electrical deionization apparatus according to claim 1, wherein the substrate of the anion-exchange fibrous material and the cation-exchange fibrous material is a fibrous material selected from a woven fabric and a nonwoven fabric.

* * * * *